US006905542B2

(12) United States Patent
Samoilov et al.

(10) Patent No.: US 6,905,542 B2
(45) Date of Patent: Jun. 14, 2005

(54) WAVEGUIDES SUCH AS SIGEC WAVEGUIDES AND METHOD OF FABRICATING THE SAME

(76) Inventors: Arkadii V. Samoilov, 1136 S. Mary Ave., Sunnyvale, CA (US) 94087; Dean E. Berlin, 3793 Kersten Dr., San Jose, CA (US) 95124

( * ) Notice: Subject to any disclaimer, the term of this patent is extended or adjusted under 35 U.S.C. 154(b) by 317 days.

(21) Appl. No.: 10/014,466

(22) Filed: Dec. 11, 2001

(65) Prior Publication Data

US 2002/0174827 A1 Nov. 28, 2002

Related U.S. Application Data

(63) Continuation-in-part of application No. 09/866,172, filed on May 24, 2001.

(51) Int. Cl.[7] .......................... C03B 25/04; C03B 29/10
(52) U.S. Cl. .......................... 117/89; 117/84; 117/103; 117/104; 385/141; 385/142
(58) Field of Search .............................. 117/84, 89, 103, 117/104; 385/141, 142

(56) References Cited

U.S. PATENT DOCUMENTS

| | | | |
|---|---|---|---|
| 3,985,590 A | * | 10/1976 | Mason |
| 5,698,890 A | * | 12/1997 | Sato ........................... 257/592 |
| 5,714,777 A | * | 2/1998 | Ismail et al. ................. 257/263 |
| 5,891,769 A | | 4/1999 | Liaw et al. |
| 5,963,817 A | | 10/1999 | Chu et al. |
| 6,059,895 A | * | 5/2000 | Chu et al. |
| 6,509,586 B2 | | 1/2003 | Awano |

FOREIGN PATENT DOCUMENTS

| | | |
|---|---|---|
| EP | 0 595 080 A1 | 10/1993 |
| EP | 0 812 023 A1 | 4/1997 |
| EP | 1 065 728 A2 | 6/2000 |
| EP | 1 094 523 A2 | 10/2000 |
| JP | 08-186249 * | 7/1996 |

OTHER PUBLICATIONS

Liu et al., "A surfactant–mediated relaxed Si Ge graded layer with a very low threading dislocation density and smoth surface", Applied Physics Letters voL 75 No. 11 pp. 1586–1588 Sep. 13, 1999.*

Pogossian et al , "Analysis of high confinement SiGe/Si waveguides for silicon based optoelectronics", J. Opt Soc. Am A vol 16, No. 3 Mar. 1999 pp. 591–595.*

Poggossian, S.P., "Analysis of High–Confinement SiGe/Si Waveguides for Silicon–based Optoelectronic", *Journal of Optical Society of America*, A vol. 16, No. 3, Mar. 1999, pp. 591–595 (note p. 592).

* cited by examiner

*Primary Examiner*—Robert Kunemund
(74) *Attorney, Agent, or Firm*—Joseph Bach; Jamie Zheng; Frank Morris

(57) ABSTRACT

A waveguide structure and method of fabricating the same, the method comprising forming a first graded layer on a substrate, wherein the first graded layer comprises a first and a second optical material, and a lattice constant adjusting material, wherein the concentration of the second optical material increases with the height of the first graded layer and the concentration of the lattice constant adjusting material varies in proportion to the second optical material; and forming a second graded layer, the second graded layer comprising the first and second optical materials, and a lattice constant adjusting material, wherein the concentration of the second optical material decreases with the height of the second graded layer and the concentration of the lattice constant adjusting material varies in proportion to the second optical material.

75 Claims, 18 Drawing Sheets

WAVEGUIDES SUCH AS SIGEC WAVEGUIDES AND METHOD OF FABRICATING THE SAME

This application is a continuation-in-part of patent application Ser. No. 09/866,172, filed on May 24, 2001.

The present invention relates generally to fabricating planar waveguide structures, and particularly to fabricating silicon germanium carbon (SiGeC) waveguide structures.

BACKGROUND OF THE INVENTION

The advent of the information age has seen an increasing drive toward extremely high-speed applications, leading to an increasing use of optical circuits in communication systems. Planar optical waveguides are widely used as components in optical communication systems. A typical planar waveguide structure comprises a lower cladding region, a light guiding core region and an upper cladding region. The light guiding core region has a higher index of refraction than either the lower or the upper cladding regions.

SiGe waveguides are of particular interest because both optical and electronic devices can be integrated on a single silicon substrate. Silicon is a well established substrate for electronic circuits, and high quality silicon is readily available at low cost. Additionally, both Si and SiGe are transparent in the 1300 nm and 1500 nm telecommunications wavelengths and further, SiGe has a higher index of refraction than Si. Finally, the optical and electrical properties of SiGe waveguides can be adjusted by varying the Ge concentration.

Although, SiGe waveguide structures are desirable for their electrical and optical properties, several problems exist with fabricating low loss SiGe waveguides. Generally, a SiGe waveguide structure comprises a lower cladding primarily composed of silicon, a silicon germanium core and an upper cladding also composed primarily of silicon. The lattice constant of Ge is 4% larger than that of Si. Thus, when SiGe is grown on pure silicon, this difference in lattice constants may cause very high misfit and threading dislocation densities in the structure. These dislocations may lead to increased optical losses in the waveguide structure.

Moreover, in the SiGe core of a typical SiGe waveguide structure, the distribution of Ge in the vertical direction may be different from the distribution of Ge in the horizontal direction. This asymmetry leads to birefringence effects. Generally, a light wave traveling down a waveguide comprises two orthogonally polarized modes, one perpendicular to the substrate and the other parallel to the substrate. In conventional SiGe waveguide structures, the perpendicular mode sees a different index of refraction from the parallel mode, leading to a dispersion of the transmitted signal.

Therefore, there is a need in the art for a process for fabricating low loss and non-dispersive waveguides on silicon that is suitable for large scale production of the waveguides.

SUMMARY OF THE INVENTION

There are several embodiments of the invention.

In one embodiment of the invention, a method of forming a planar waveguide structure comprises forming a first graded layer on a substrate, the first graded layer comprising silicon, germanium and carbon wherein the germanium and carbon concentrations increase with the height of the first graded layer; forming a uniform layer on the first graded layer; and forming a second graded layer on the uniform layer, the second graded layer comprising silicon, germanium and carbon wherein the germanium and carbon concentrations decrease with the height of the second graded layer.

In another embodiment of the present invention, a method of forming a planar waveguide structure comprises providing a substrate having an etched pattern; forming a uniform layer on the substrate such that the uniform layer fills the etched pattern, the uniform layer containing silicon, germanium and carbon wherein the germanium and carbon concentrations remain constant in the uniform layer; and planarizing the uniform layer.

In one embodiment of the present invention, each SiGeC layer in the planar waveguide structure is formed by a chemical vapor deposition process comprising the steps determining desired Ge and/or C concentration profiles and desired layer thickness; determining flow rates of a plurality of gases; and introducing into the deposition chamber the plurality of gases according to the determined flow rates while maintaining a pre-determined pressure and temperature in the deposition chamber. For a graded SiGeC layer, the flow rates of at least a portion of the plurality of gases are adjusted during the deposition process to achieve the desired Ge and/or C concentration profiles.

In one embodiment of the present invention, determining the flow rates of a plurality of gases further comprises obtaining experimental data of germanium concentration as a function of the flow rate of a first gas among the plurality of gases; obtaining experimental data of carbon concentration as a function of the flow rate of a second gas among the plurality of gases; and calculating the flow rates of the first and second gases based on the obtained experimental data and the desired concentration profile.

In yet another embodiment of the present invention, a method of forming a planar waveguide structure comprises providing a substrate, a first portion of the substrate being covered by a layer of material different from that of the substrate, selectively depositing a uniform SiGeC layer on a second portion of the substrate not covered by the layer of material. A CVD process is used to selectively deposit the SiGeC layer and comprises the steps of providing a plurality of deposition gases for depositing the SiGeC layer; providing at least one etchant gas for removing the SiGeC layer as it is being deposited; and wherein the SiGeC layer is being removed faster than it is deposited on the first portion of the substrate, and the SiGeC layer is being deposited faster than it is removed on the second portion of the substrate.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
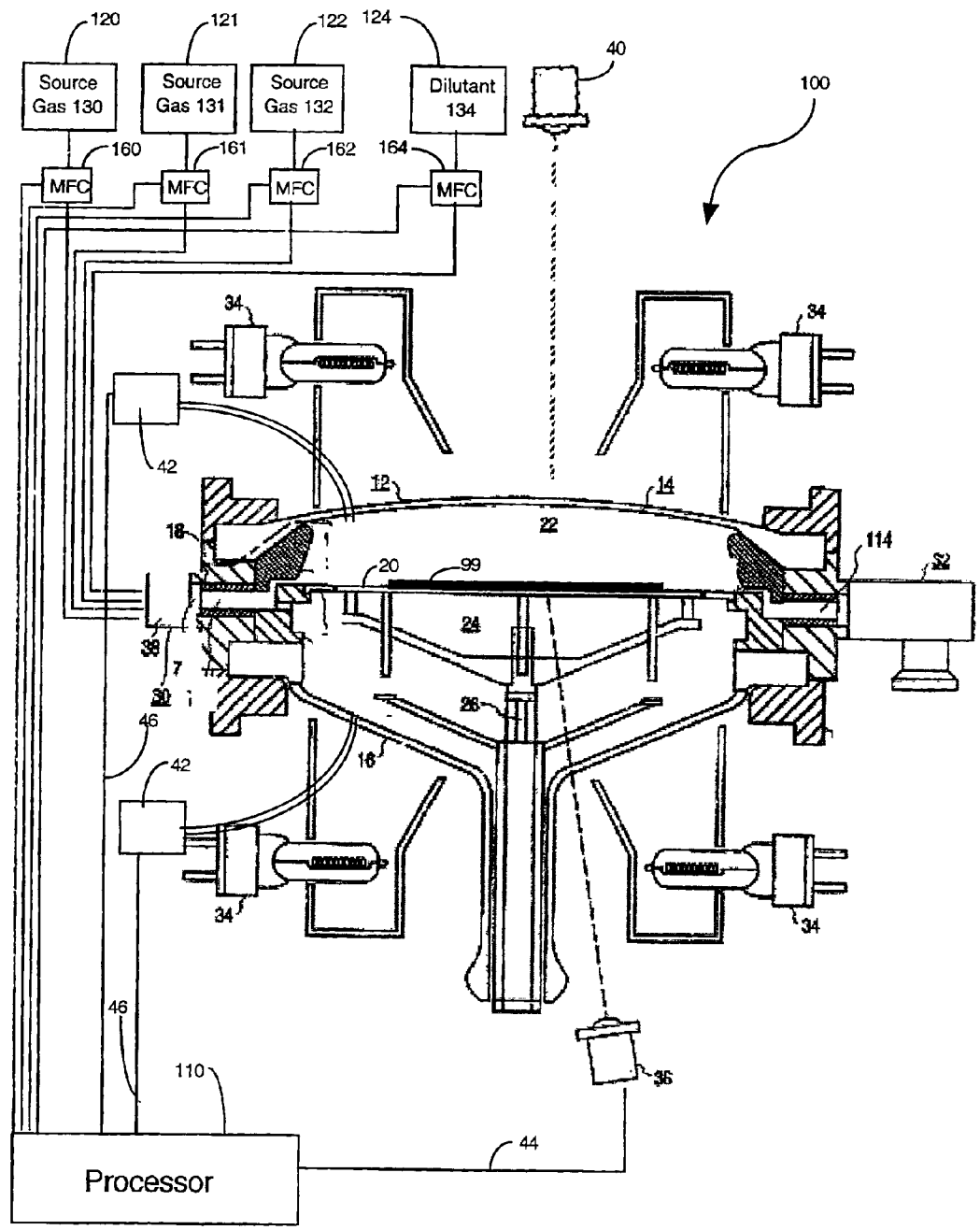
FIG. 1 is a diagram of an exemplary reactor that may be used to implement the present invention.

FIG. 1 shows a reactor 100 that may be used to fabricate waveguides in accordance with the invention. Reactor 100 may be a commercially available deposition system, such as the EPI Centura system available from Applied Materials, Inc. of Santa Clara, Calif., modified according to the invention described. It is to be appreciated that the invention is not limited to an EPI Centura system but can be accommodated by other deposition systems.

Reactor 100 comprises a deposition chamber 12 having an upper dome 14, a lower dome 16 and a side wall 18. Within chamber 12 is a susceptor 20 which extends transversely across chamber 12 dividing chamber 12 into an upper portion 22 above susceptor 20 and a lower portion 24 below susceptor 20. A wafer 99 is supported on the upper surface of susceptor 20. Susceptor 20 is mounted on a shaft 26 that is connected to a motor used to rotate shaft 26, susceptor 20 and wafer 99 thereon.

An inlet manifold 30 in side wall 18 admits one or more gases into chamber 12. An outlet port 32 in side wall 18 opposite the inlet manifold is used to exhaust gases from chamber 12. A plurality of high intensity lamps 34 mounted around chamber 12 direct their light through the upper and lower domes onto susceptor 20 to heat susceptor 20 and wafer 99 thereon. Lower and upper pyrometers 36 and 40 are used to monitor the temperature of chamber 12. The pressure in chamber 12 is monitored by one or more pressure sensors 42 and regulated by, for example, controlling a vacuum source and a pressure control valve.

A processor 110 controls the temperature and pressure inside chamber 12. Processor 110 can be a computer chip incorporated into reactor 100 or may be a separate digital computer having executable program instructions. Pyrometers 36 and 40 are coupled to processor 110 thru lines 44. Processor 110 uses received information about the substrate temperature to control heat lamps 34, thereby controlling the substrate temperature. The one or more pressure sensors 42 are also coupled to processor 110 by lines 46. Processor 110 uses received information about the chamber pressure to control the pressure by, for example, controlling a vacuum source and a pressure control valve coupled to chamber 12.

FIG. 1 further shows a gas supply system used to introduce constituents into deposition chamber 12. In one embodiment, the system includes at least three source gas supplies 120, 121 and 122 for providing three different source gases 130, 131 and 132, and a dilutant/inert gas supply 124 for providing a dilutant/inert gas. Processor 110 controls the introduction of each source gas and the dilutant/inert gas through manifold 30 and controls the flow of each gas through variable flow rate mass flow controllers 160, 161, 162 and 164. The source gases and the dilutant gas can be mixed in chamber 12 or, preferably, pre-mixed before entering chamber 12, as shown in FIG. 1.

Figure 2A:
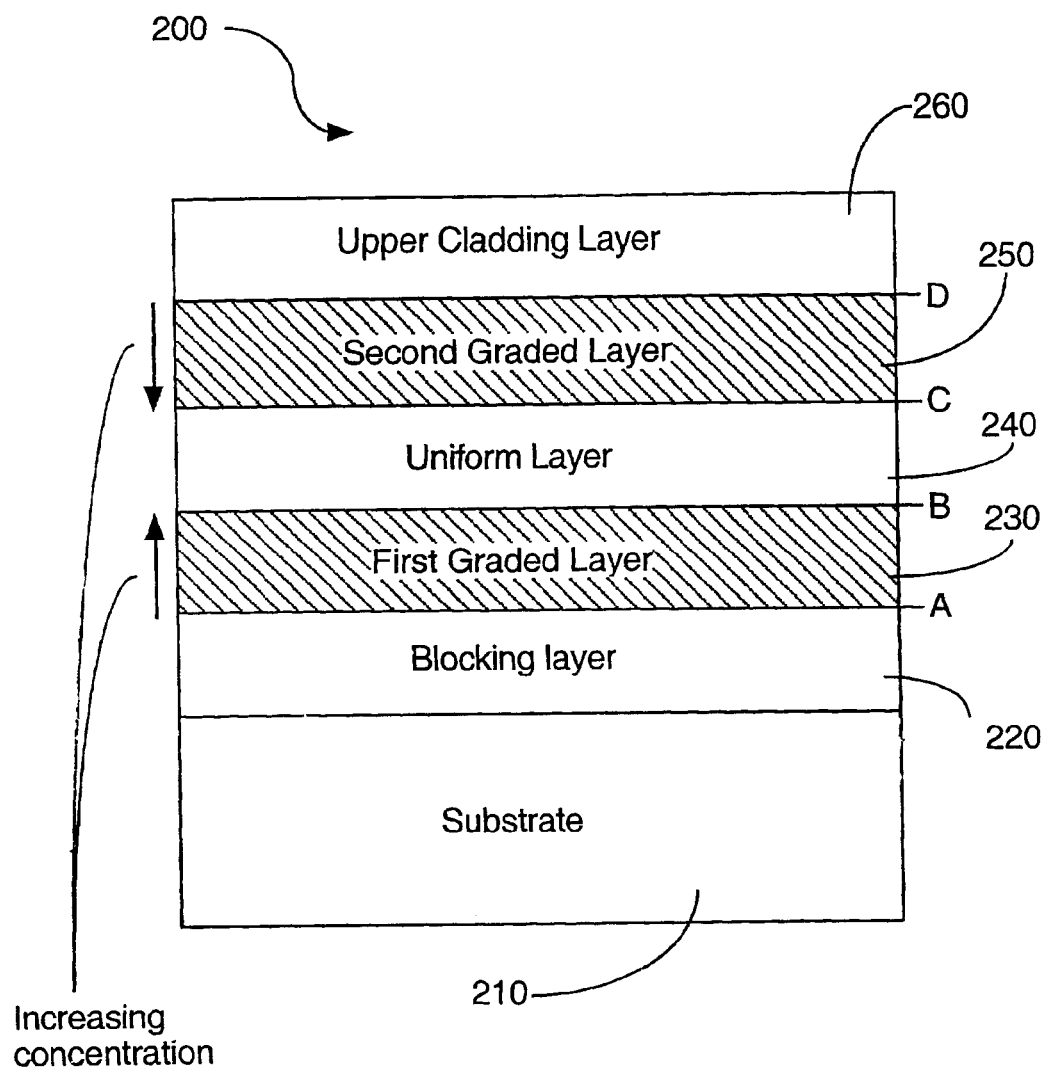
FIG. 2A illustrates a waveguide structure that may be fabricated in accordance with an embodiment of the invention.

FIG. 2A illustrates schematically a waveguide structure 200 that may be fabricated in accordance with an embodiment of the invention. In this embodiment, waveguide structure 200 comprises a substrate 210, a blocking layer 220 formed over substrate 210, and a first graded layer 230 formed over blocking layer 220. Waveguide structure 200 further includes a uniform layer 240 formed over the first graded layer 230, a second graded layer 250 formed over uniform layer 240 and an upper cladding layer 260 formed over the second graded layer 250. Graded layers 230 and 250 have an index of refraction that varies monotonically with the height of each layer. In particular, the index of refraction increases with height in layer 230 and decreases with height in layer 250.

The first and second graded layers, 230 and 250, and the uniform layer 240 are composed of a first optical material, a second optical material, and a third lattice constant adjusting material. The two optical materials are selected such that the index of refraction of the resulting layer varies as the relative concentrations of the two materials changes. In one embodiment of the present invention, the first optical material is a silicon source material and the second optical material is an index of refraction adjusting material, such as germanium. The index of refraction at any point in the first or second graded layer or the uniform layer depends on the concentration of Ge and increases as the concentration of Ge increases.

In the first graded layer 230, the concentration of the second optical material increases with the height of the graded layer, and the concentration of the third material is kept in proportion to that of the second material. The height is measured along a direction perpendicular to the substrate 210 from the interface of the blocking layer 220 and the first graded layer 230 to the interface of the first graded layer 230 and the uniform layer 240. In one embodiment, the concentration profile along the direction perpendicular to substrate 210 varies in a linear fashion (see FIG. 3(a)). However, other embodiments where the concentration profile varies in a non-linear fashion are also contemplated (See for example FIGS. 3(d)–3(f)).

The uniform layer 240 is composed of the same two optical materials and the same third lattice constant adjusting material as used for forming the graded layers, 230 and 250. However, the relative concentrations of the three materials remain constant throughout the uniform layer 240. In one embodiment, the relative concentrations of the three materials are the same as those at interfaces B and C of the first and second graded layers 230 and 250, respectively. In other embodiments, the concentrations are selected such that the index of refraction of the uniform layer is higher than both the index of refraction of the first graded layer 230 at interface B and the index of refraction of the second graded layer 250 at interface C.

The second graded layer 250 is composed of the same two optical materials and the same third lattice constant adjusting material used to form the first graded layer 230 and the uniform layer 240, but the concentrations of the second and third materials decrease with the height of the second graded layer 250. The height is measured along a perpendicular to the substrate from the interface of the uniform layer 240 and the second graded layer 250 to the interface of the second graded layer 250 and the upper cladding layer 260. In one embodiment, the concentration profile along a perpendicular to the substrate varies in a linear fashion (see FIG. 3(*a*)). However, other embodiments, as described later in connection with FIG. 3, where the concentration profile varies in a non-linear fashion are also contemplated (FIGS. 3(*d*)–3(*f*)).

Substrate 210 is any substrate suitable for chemical vapor deposition, such as for example a silicon substrate. Most commercially available substrates contain some amounts of contaminants. During formation of the waveguide structure, these contaminants may diffuse into the waveguide structure and contribute to optical losses in the resulting waveguide structure.

A blocking layer 220 is used to prevent contaminants from substrate 210 from diffusing into layers 230, 240, 250, 260 during the formation of the waveguide structure. The thickness of the blocking layer 220 is dependent on the amounts of contaminants in the substrate. If substrate 210 contains high levels of contaminants, a thick blocking layer 220 may be needed. If the level of contaminants is low, then a thin layer 220 will suffice. The blocking layer 220 can be any suitable material that prevents contaminant diffusion and has a lower index of refraction than that of the first graded layer 230 at interface A. The blocking layer 220 may be, for example, epitaxial silicon. The blocking layer 220 may not be necessary where the substrate 210 is pure or contains negligible amounts of contaminants.

The upper cladding layer is used to confine a light beam propagating in the first graded layer 230, the second graded layer 240, and the uniform layer 250 to the layers 230, 240 and 250. The material for the upper cladding layer is any suitable material with an index of refraction less than that of layers 230, 240, and 250. Preferably, the index of refraction of the upper cladding layer is the same as the index of refraction of the substrate. Preferably, the upper cladding layer is composed of the same material as the substrate 210. The thickness of the cladding layer is selected such that a light beam traveling in layers 230, 240 and 250 effectively sees a cladding layer of infinite thickness. Preferably, the cladding layer thickness is in the range of about 1–20 μm.

Figure 2B:
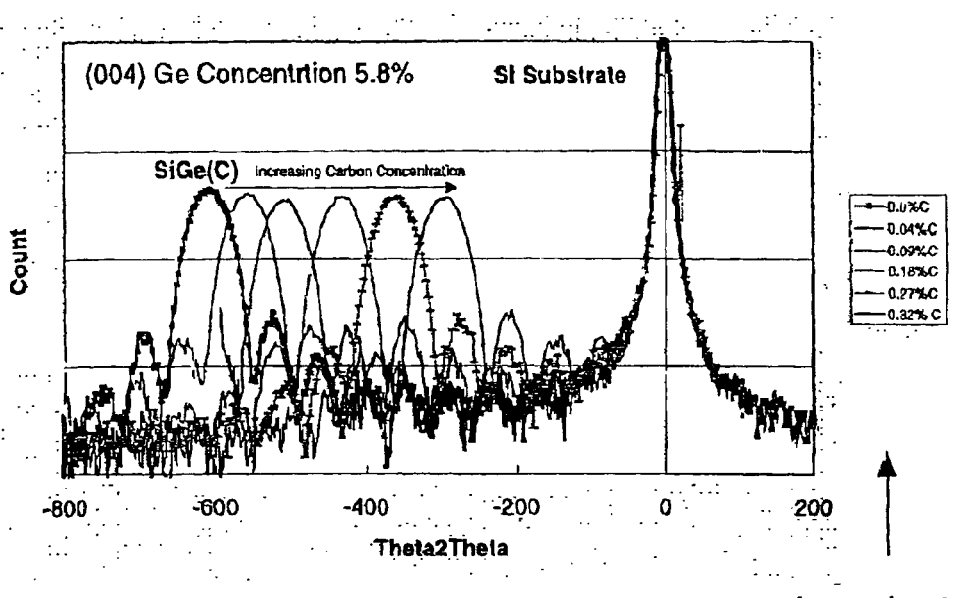
FIG. 2B is an X-ray photoelectron diffraction graph of a SiGeC layer that illustrates the effect of added carbon on the lattice constant of the SiGeC layer.

In one embodiment of the present invention, the third material is carbon. The third material is introduced to reduce losses caused by misfit and threading dislocations due to the difference in lattice constant between the first or second graded layer or the uniform layer and the blocking layer or the upper cladding layer or the silicon substrate. The close match of lattice constants between the different layers helps to reduce dislocation and lattice strain at the interface of these layers. FIG. 2B is an X-ray Photoelectron Diffraction graph of a SiGeC layer that illustrates the effect of added carbon on the lattice constant of the SiGeC layer. FIG. 2B shows that the lattice constant of the SiGeC layer moves closer and closer to that of Si as the percentage of carbon is increased from 0% to 0.32% in the SiGeC layer.

In one embodiment, the waveguide structure 200 does not include the upper cladding layer 260. In this case, the air confines a light beam to layers 230, 240 and 250. In another embodiment, waveguide structure 200 does not include a blocking layer. In yet another embodiment, the waveguide structure 200 does not include uniform layer 240. In this structure, the second graded layer is formed immediately over the first graded layer.

In other embodiments, the waveguide structure 200 does not include first and second graded layers. Rather, the structure 200 comprises a substrate 210 and a uniform layer 240 formed immediately over substrate 210. Such structure 200 may further include a blocking layer 220 and an upper cladding layer 260. Preferably, layers 220 and 260 are composed primarily of epitaxial silicon.

Figure 3:
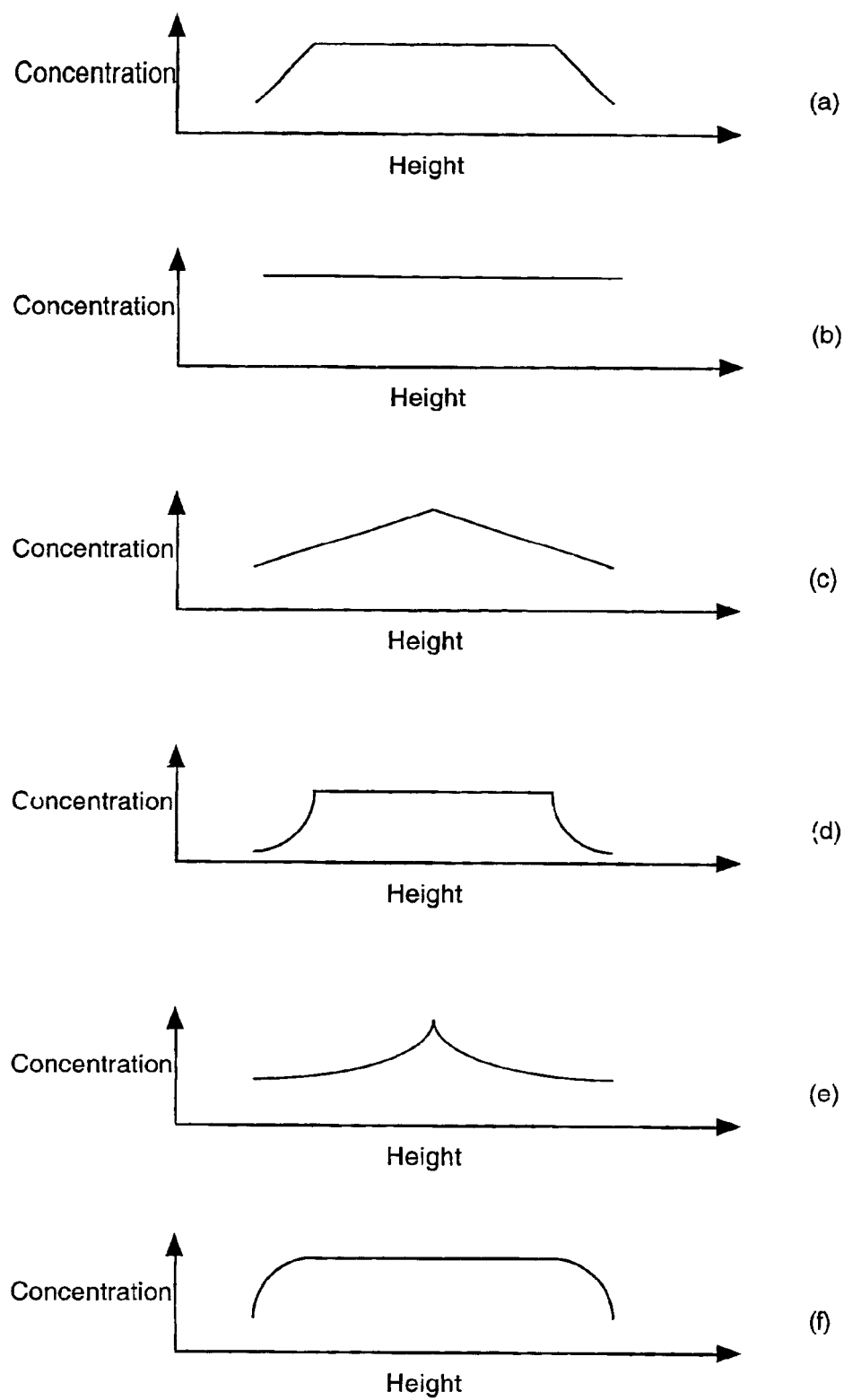
FIG. 3 illustrates concentration profiles of waveguide structures fabricated in accordance with the invention.

In one embodiment, the concentration profiles of the first and second graded layers are symmetric, i.e. the rate of decrease of germanium and carbon concentrations in the second graded layer 250 is the same as the rate of increase of germanium and carbon concentrations in the first graded layer 230. Other embodiments where the concentration profiles of the first and second graded layers are not symmetric are also contemplated. Preferably, the substrate is a silicon substrate. Optionally, a blocking layer is formed on the substrate and comprises epitaxial silicon. The thickness of the blocking layer is typically in the range of about 0–10 μm. A first graded layer 230 is formed on the blocking layer and comprises Si, Ge and carbon. In this embodiment, the Ge and carbon concentration in the first graded layer increases linearly with height as shown in FIGS. 3(*a*) and 3(*c*). Other Ge and carbon concentration profiles, such as those illustrated in FIGS. 3(*d*)–3(*f*), are also contemplated.

In this embodiment, the germanium concentration at interface A is about 0% and the germanium concentration at interface B is about 2–5% and increases with the height of the layer, e.g. increases linearly along a perpendicular to the substrate. Typically, the Ge concentration in the first graded layer 230 ranges from about 0% to about 5% and increases at a rate between about 0.1% per μm to about 10% per μm of the height of the graded layer 230. In one embodiment, the Ge concentration in the graded layer 230 increases from about 0% at interface A to about 2% at interface B at a rate of about 5–10% per μm, resulting in a graded layer 230 that is about 0.2–0.4 μm thick.

In this embodiment, the Ge concentration in the uniform layer 240 is in the range of about 2–5% and the uniform layer thickness is in the range of about 2–5 μm. Preferably, the Ge concentration in the uniform layer 240 is the same as the Ge concentration at interfaces B and C of the first and second graded layers 230 and 250, respectively. In another embodiment, the Ge concentration in the uniform layer 240 is higher than the Ge concentration at interfaces B and C of the first and second graded layers 230 and 250, respectively. Thus, in this embodiment, the index of refraction of the uniform layer 240 is higher than the index of refraction of layers 230 and 250 at interfaces B and C respectively.

In the second graded layer 250, the Ge concentration decreases with the height, and is in the range of about 5% to about 0% and decreases at a rate between about 0.1% per μm to about 10% per μm of the height of the second graded layer 250. In one embodiment, the Ge concentration decreases from about 2% at interface C to about 0% at interface D at a rate of about 5–10% per $\mu$m, resulting in a second graded layer 250 that is about 0.2–0.4 $\mu$m thick. Preferably, the concentration profile and the thickness of the first graded layer 230 is symmetrical to the concentration profile and thickness of the second graded layer 250. Preferably, an upper cladding layer 260, composed primarily of epitaxial silicon, is formed on the second graded layer 250.

Preferably, in the first and second graded layer, and the uniform layer, the carbon concentration is about 10% of the Ge concentration at any point in each layer.

FIG. 3 illustrates concentration profiles that may be used to fabricate waveguide structures in accordance with one embodiment of the invention. FIGS. 3(*a*), (*d*) and (*f*) show concentration profiles of the second optical material, e.g. Ge, for exemplary waveguide structures 200 in accordance with three embodiments of the invention that employ a uniform layer 240. In these embodiments, the concentration of the second optical material increases monotonically with height in the first graded layer 230, the concentration remains constant in the uniform layer 240 and the concentration decreases monotonically with height in the second graded layer 250. The increase and decrease in concentration may both be a linear function of height as shown in FIG. 3(*a*) or a non-linear function. For examples, as shown in FIG. 3(*d*), the concentration in the first graded layer 230 increases with height more and more rapidly from the bottom to the top of the first graded layer and the concentration in the second graded layer 250 decreases with height less and less rapidly from the bottom to the top of the second graded layer. Another example of non-linear changes is shown in FIG. 3(*f*) where the concentration in the first graded layer increases rapidly with height near the bottom of the first graded layer and saturates near the interface between the first graded layer and the uniform layer, while the concentration in the second graded layer decreases more and more rapidly from the interface between the uniform layer and the second graded layer to the top of the second graded layer. Optionally, a blocking layer 220 is formed before the first graded layer 230 is formed. These embodiments may also contain an upper cladding layer 260 over the second graded layer 250.

FIG. 3(*b*) shows the concentration profile where the structure contains only a uniform concentration layer on substrate 210. This embodiment does not contain first or second graded layers. In this embodiment, the uniform layer 240 is formed directly over substrate 210. The structure may optionally contain a blocking layer between the substrate 210 and the uniform layer 240 and/or an upper cladding layer over uniform layer 240. FIGS. 3(*c*) and (*e*) illustrate concentration profiles of structures that do not contain a uniform layer. Again, the increase or decrease in concentration may be a linear function of height as shown in FIG. 3(*c*) or some non-linear function as shown in FIG. 3(*e*) that increases monotonically to a maximum and then decreases monotonically. In these embodiments, the second graded layer 250 is formed directly over the first graded layer 230. Optionally, a blocking layer 220 is formed before the first graded layer 230 is formed. The structure 200 may also contain an upper cladding layer 260 over the second graded layer 250.

Preferably, the carbon concentration profile in the SiGeC waveguide structure is similar to that of the Ge concentration profile, which can be any one of the concentration profiles shown in FIGS. 3(*a*)–(*f*), as the concentration of carbon stays in proportion to the concentration of germanium throughout the structure.

Process Control of Film Growth Rate and Ge/C Concentration Profile

Waveguide structure 200 is fabricated using chemical vapor deposition(CVD) processes, preferably, a low pressure chemical vapor deposition (LPCVD) process. Reactor 100 can be used for such a LPCVD process. Processor 110 controls the introduction of first, second and third source gases, 130, 131 and 132, and the dilutant gas 134, which are used to form films on substrate 210, such as the blocking layer 220, graded index films 230 and 250, uniform index film 240, and the upper cladding layer 260. To fabricate a SiGeC waveguide, the first source gas 130 is a silicon gas, meaning any suitable source gas that is used for forming silicon films, for example silane, disilane, trisilane, dichlorosilane, trichlorosilane, or their mixtures with each other or with hydrogen. The second source gas 132 is a germanium gas, meaning any source gas used to form germanium films that is compatible with the first source gas 130, for example germane ($GeH_4$), digermane, their mixture with each other or with hydrogen. The third source gas 132 is a carbon gas, meaning any source gas used to form carbon films that is compatible with the first and the second source gases, for example, methylsilane ($SiCH_6$) or its mixture with hydrogen. Preferably, the first source gas 130 is silane ($SiH_4$), the second source gas 131 is germane ($GeH_4$) mixed with $H_2$, for example, 1% germane in $H_2$, and the third source gas 132 is methylsilane $SiCH_6$ mixed with $H_2$, for example, 10% methylsilane in $H_2$. The dilutant gas 134 is $H_2$.

When the pressure and temperature of the chamber is kept constant, the flow rate of each source gas into the deposition chamber is one of the factors that determines the growth rate of a layer of film deposited on the substrate and also the concentration profiles of Ge and C in the layer of film. For example, the flow rate of silane determines the growth rate of a silicon layer on substrate 210. These flow rates are regulated by mass flow controllers 160, 161, 162, and 164 that, in turn, are controlled by processor 110 so as to form a desired thickness of each layer. One method for determining the appropriate flow rate of a species and deposition time is described in greater detail below.

Figure 6:
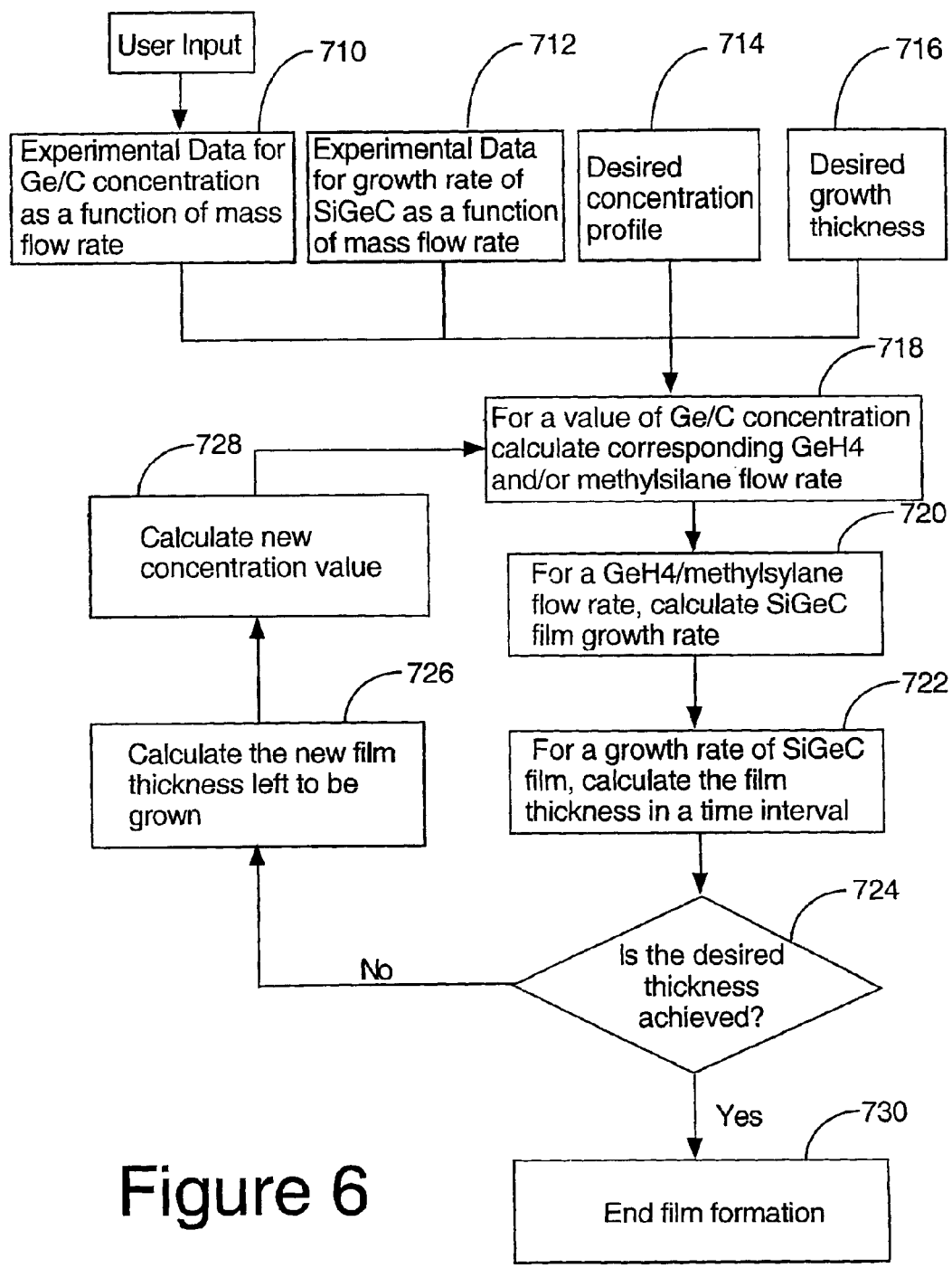
FIG. 6 is a flow chart of a process for forming a layer with a predetermined concentration profile in accordance with one embodiment of the invention.
Figure 7A:
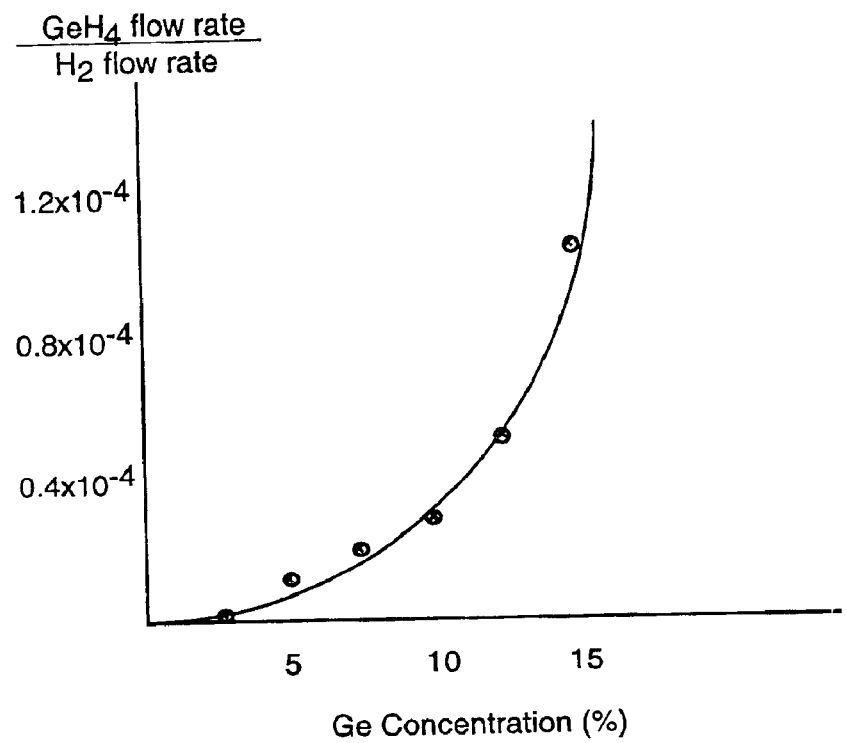
FIG. 7A illustrates a curve fit of an experimentally determined concentration of germanium in films formed with six discrete gas flow rates.
Figure 7B:
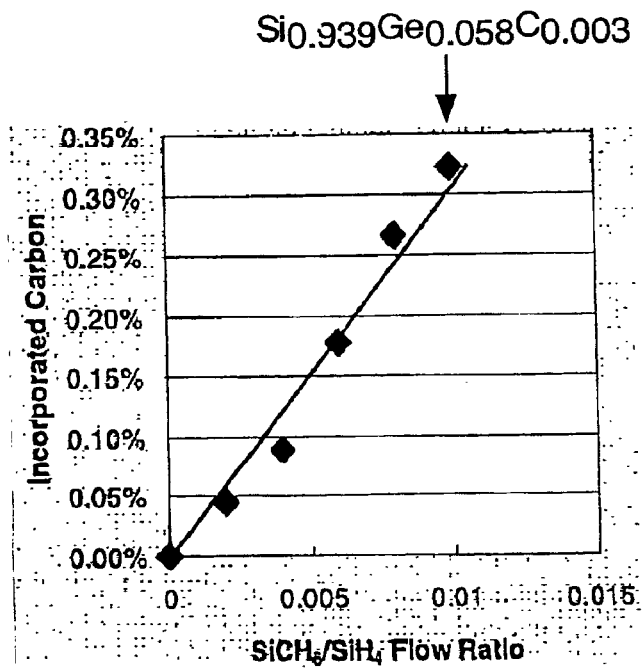
FIG. 7B illustrates a curve fit of an experimentally determined concentration of carbon in films formed with six discrete gas flow rates.

FIG. 6 illustrates a flow chart of a program used by the processor 110 to control the formation of a SiGeC layer with a predetermined concentration profile. The program is preferably stored in a computer readable medium accessible by the processor 110. As shown in FIG. 6, in order to form a layer with a desired concentration profile, processor 110 takes as inputs experimental data for Ge and C concentrations in a film as a function of germane and methylsilane mixture flow rates, respectively. (Step 710). The experimental data for Ge concentration were obtained by measuring Ge concentrations in films formed on a plurality of test wafers with a plurality of flow rates of germane mixture through mass flow controller 161 while the other gas flow rates are kept constant. The experimental data for C concentration were obtained by measuring C concentrations in films formed on a plurality of test wafer with a plurality of flow rates of methylsilane mixture through mass flow controller 162 while the other gas flow rates are kept constant. Preferably, the first source gas and the dilutant gas flow rates used to obtain the experimental data are the same as those used in the corresponding actual deposition processes. Once these data are collected for the plurality of flow rates, a curve is established for the Ge or C concentrations as a function of germane or methylsilane mixture flow rates, respectively, through a curve fitting algorithm, such as the least square fit method using the Gauss-Jordan algorithm to calculate the coefficients of a polynomial that best fits the experimental measurements. FIG. 7A illustrates a curve fit of experimentally determined germanium concentrations corresponding to six discrete ratios of germane mixture flow rate over the dilutant gas flow rate. FIG. 7B illustrates a curve fit of experimentally determined substitutional carbon concentrations corresponding to six discrete ratios of methylsilane mixture flow rates over silane flow rates.

Figure 8:
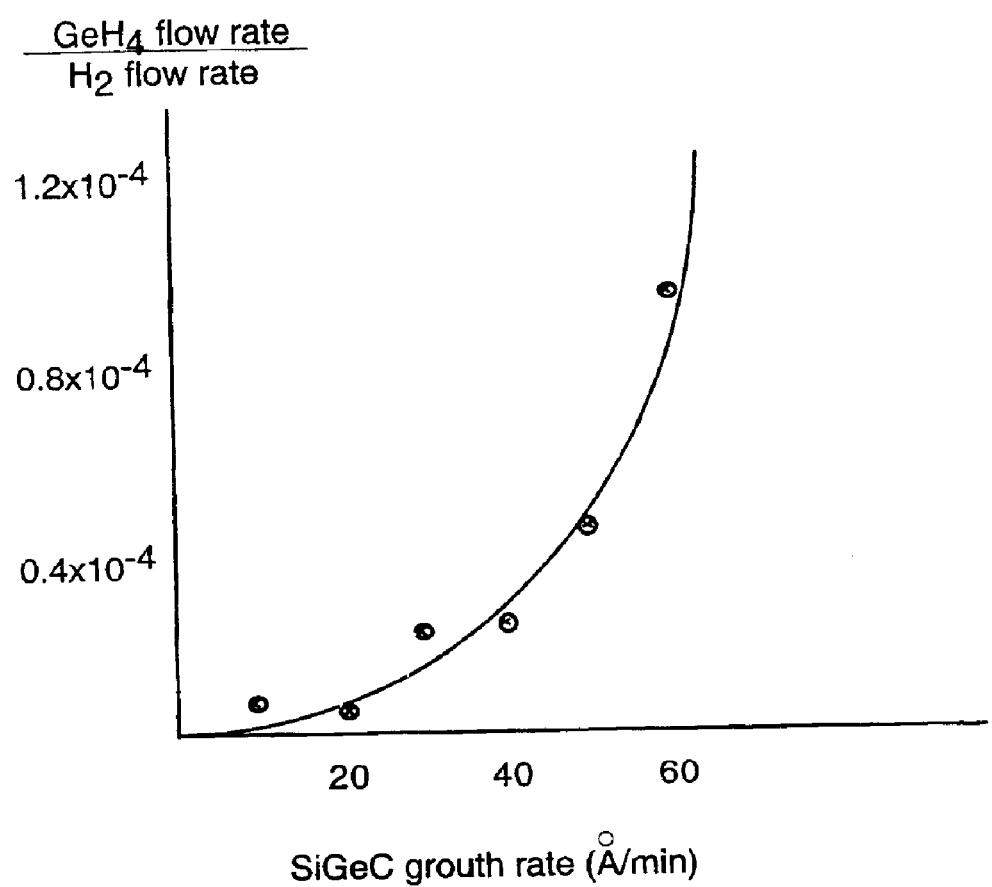
FIG. 8 illustrates a growth rate curve established by curve fitting using experimentally measured SiGeC film growth rates corresponding to six discrete ratios of germane mixture flow rate over the dilutant gas flow rate.

In one embodiment of the present invention, while a SiGeC film is being deposited, the silane flow rate and the dilutant gas flow rate are kept constant, and the methylsilane flow rate varies in accordance with the germane mixture flow rate. Therefore, the SiGeC film growth rate is determined mainly by the germane mixture flow rate. The processor 110 also takes as input the experimental data for the SiGeC film growth rate as a function of the germane mixture flow rate. (Step 712) In one embodiment, the experimentally measured growth rates are measured from the same test wafer used to measure the Ge concentrations. A growth rate curve is established through a curve fitting algorithm, such as the Gauss-Jordan algorithm. FIG. 8 illustrates such a growth rate curve where the SiGeC film growth rate is shown to be a function of the ratio of germane mixture flow rate over the dilutant gas flow rate. This curve is established by curve fitting using the experimentally measured SiGeC film growth rates corresponding to six discrete ratios of germane mixture flow rate over the dilutant gas flow rate. Steps 710 and 712 may be performed in any order relative to each other or simultaneously.

To form the first graded SiGeC layer, a desired concentration profile as a function of thickness is also entered into processor 110. (Steps 714 and 716). Processor 110 uses the desired concentration profile and the desired thickness to calculate the desired Ge and C concentrations at different points of the film growth. At the beginning of each predetermined time interval during film growth, for a desired concentration, the corresponding germane flow rate is calculated from FIG. 7A, and the corresponding methylsilane flow rate is calculated from FIG. 7B. (Step 718). The flow rate is then used to calculate the SiGeC growth rate from FIG. 8. (Step 720). This growth rate is used along with the predetermined time interval ($\Delta t$) to determine the thickness of a SiGeC film for that time interval. (Step 722). Processor 110 then adjusts the flow of silane 130, germane 131, methylsilane 132 and hydrogen 134 into chamber 12. Preferably, the flow rates of silane 130 and hydrogen 134 are kept at predetermined values that are preferably the same as those used to calculate the germane and methylsilane flow rates and the SiGeC growth rate. The germane and methylsilane flow rates are adjusted according to the values calculated from the concentration data points.

The deposited SiGeC film thickness during the predetermined time interval ($\Delta t$) is subtracted from the total desired thickness to establish the thickness left to be grown. (Step 726). The new thickness and the desired input concentration profile as a function of thickness is used to calculate a new Ge and C concentration values. (Step 728). The above process is repeated for these new concentration values for a second time interval. This iterative process is continued until the total desired thickness is achieved.

When depositing the blocking layer and the upper cladding layer, calibration of processor 110 is performed by measuring the thicknesses of a species, such as silicon, on a test substrate for a plurality of flow rates of the source gas and deposition times. For example, to determine the growth rate of silicon, processor 110 measures the thickness of silicon layers for a plurality of flow rates of silane.

Processor 110 then determines the thickness as a function of flow rate using curve fitting techniques known in the art, such as least square curve fitting using Gauss-Jordan algorithms (such as the ones used for FIG. 7A). Processor 110 then uses this curve to calculate the appropriate flow rate and deposition time to form a silicon layer of desired thickness. Where the operator specifies a specific flow rate and thickness, processor 110 uses the curve to determine the time interval required to form a silicon layer of a specified thickness.

Figure 4:
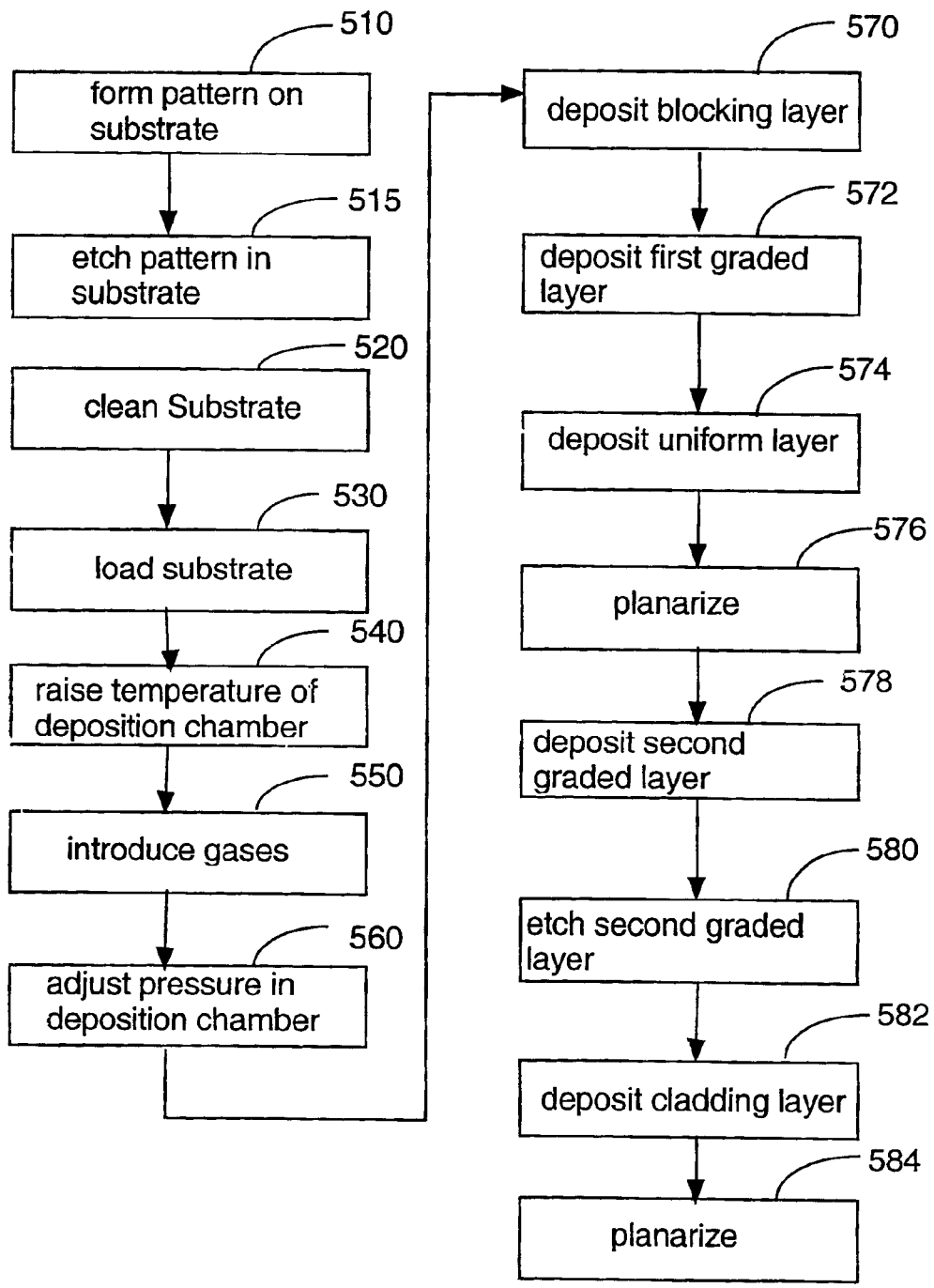
FIG. 4 is a flow chart of the processing steps used to fabricate waveguide structures in accordance with an embodiment of the invention.
Figure 5:
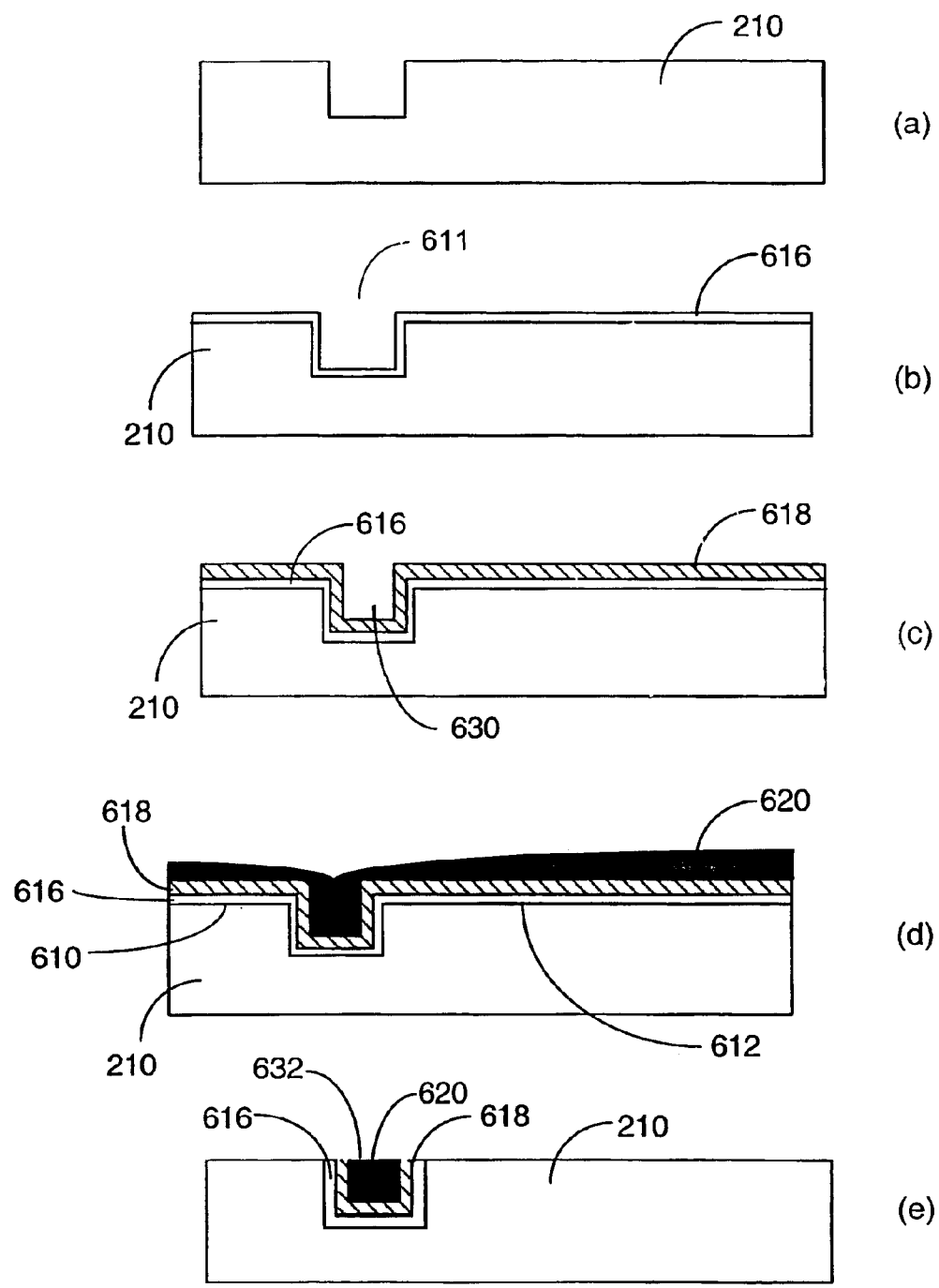
FIG. 5 illustrates schematic cross sections of the waveguide structure at some of the processing steps of FIG. 4.
Figure 5:
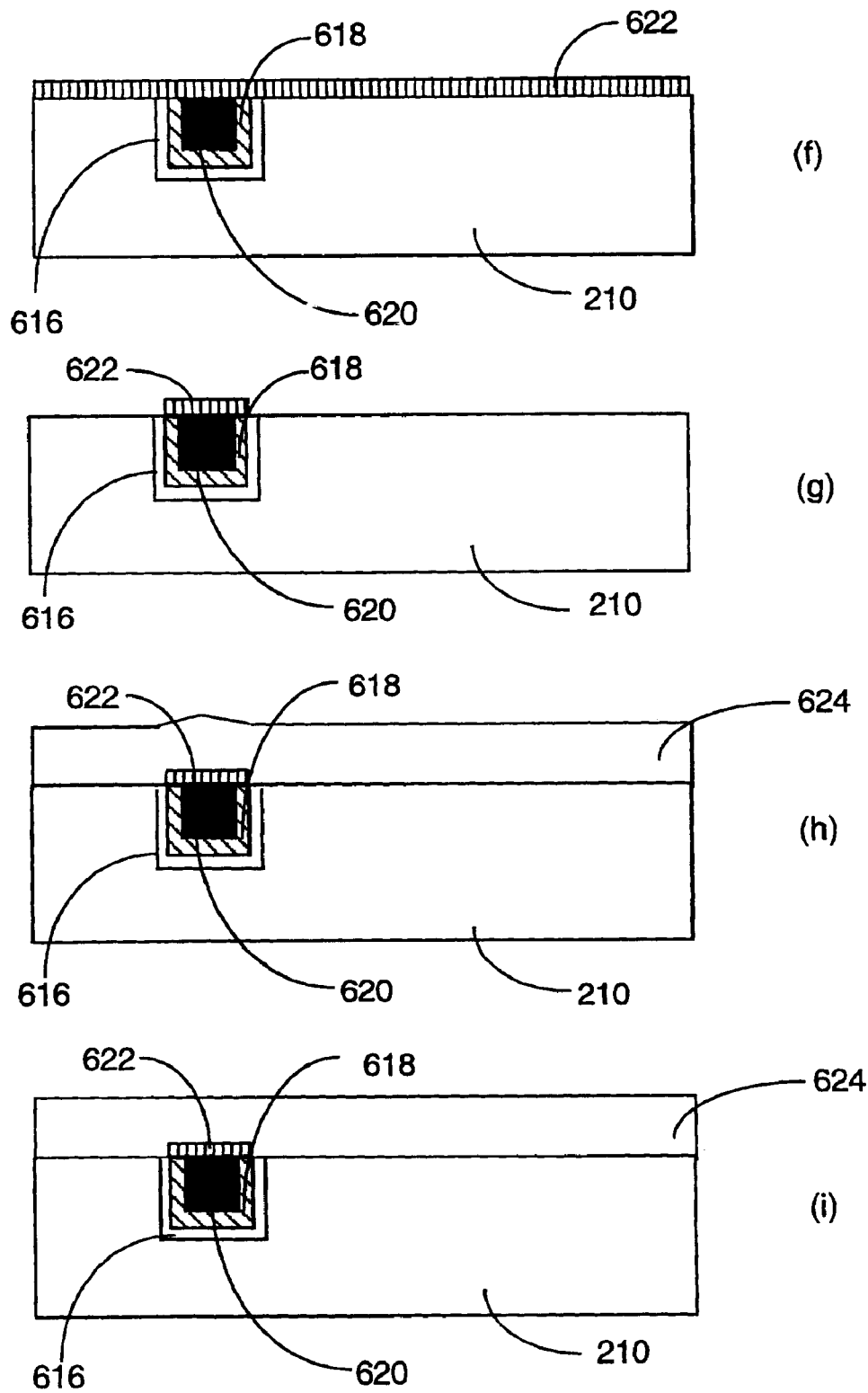

FIGS. 4 and 5 illustrate the processing steps used to fabricate waveguide structure 200 in accordance with an embodiment of the invention.

First, a predetermined pattern 611 is formed on a substrate 210 using standard photolithographic techniques known in the art (Step 510). The substrate 210 is any substrate suitable for opto-electronic device fabrication, preferably Si. Next, the pattern is etched in the substrate 210 using etching techniques known in the art. (Step 515, FIG. 5(a)) The substrate surface is then cleaned to remove contaminants, such as native oxides that are formed when the surface of the substrate is exposed to air, prior to placing the etched substrate 210 in the deposition chamber 12. (Step 520). In one such cleaning technique, the substrate is pre-processed by dipping it in a water-based hydroflouric acid solution. The wafer is then placed in the deposition chamber and baked at about 900 C for approximately one minute.

Where lower temperatures are desired, a dedicated preclean chamber such as the one used in the Epi Centura system available from Applied Materials of Santa Clara, Calif., may be used to perform the cleaning step. In this case, the wafer is first dipped in a water-based solution of hydroflouric acid. Next, the wafer is placed in the pre-clean chamber and baked at a first temperature for a predetermined time interval and then baked at a second temperature for a second predetermined time interval. In one instance, the first bake is performed at about 750–770° C. and the second bake is performed at temperatures in the range of about 770–795° C.

The cleaned substrate 210 is then loaded on susceptor 20 of reactor 100 between domes 14 and 16 (Step 530). Next, chamber 12 of the reactor 100 is heated to the desired temperature using the high intensity lamps 34. (Step 540). Preferably, chamber 12 is heated to a temperature between about 550 C and 1200 C. More preferably, chamber 12 is heated to about 600–700° C. Forming the SiGeC layers at such temperatures helps to incorporate carbon atoms into the lattice of the SiGeC films being deposited in the deposition chamber. It is believed that only the concentration of substitutional carbon atoms have an effect on the lattice constant of the SiGeC layer. The first, second and third source gases 130 131, and 132, and dilutant gas 134 are next introduced into chamber 12. (Step 550). The pressure in chamber 12 is then adjusted until the desired pressure is reached. (Step 560). For low pressure CVD, the pressure in chamber 12 is maintained below 760 Torr. Although Steps 540, 550 and 560 have been described as having been performed in a particular sequence, those skilled in the art will recognize that these steps may be performed in any order.

After the desired pressure and temperature are reached, a series of layers are formed by CVD or LPCVD on substrate 210. In the case of a SiGeC waveguide, processor 110 controls the introduction of silane, germane/$H_2$, methylsilane/$H_2$ and hydrogen through mass flow controllers 160, 161, 162 and 164, respectively. In one embodiment of the present invention, the silicon blocking layer 616 is first deposited (step 570). For the deposition of the silicon blocking layer 616, processor 110 sets mass flow controller 160 in the range of about 10–500 standard cubic centimeters per minute (sccm) and sets mass flow controller 164 in the range of about 5–70 standard liter per minute (slm). Preferably, processor 110 sets mass flow controller 160 to about 50 sccm and mass flow controller 164 at about 30–40 slm.

A first graded SiGeC layer 618 is next formed by CVD or LPCVD over blocking layer 616. (Step 572, FIG. 5(c)). Preferably, silane, 1% germane in $H_2$ and 10% methylsilane in $H_2$ are used to form the first graded SiGe layer 618. The concentration change of a species, such as germanium or carbon, over a height of a film may be accomplished at the mass flow controller 161 or 162, by changing the flow rate of the source gas 131 or 132, respectively, into the chamber 12, using the technique for forming desired concentration profiles of Ge and C in the first graded layer as disclosed above in connection with FIG. 6.

In one embodiment, the silane and hydrogen flow rates are maintained at a constant flow rate while the germane mixture and methylsilane mixture flow rates are increased concurrently from 0 sccm to predetermined flow rates based on the desired concentration gradients and the desired final concentrations of Ge and C in the first graded layer 618. Preferably, the Ge and C concentrations in the first graded layer 618 increases with height at a rate of 5–10% per $\mu$m until the desired final Ge and C concentrations is achieved. In the preferred embodiment, the desired final germanium concentration is 2%, and the desired final substitutional carbon concentration is 0.2%. Preferably, the silane flow rate into the deposition chamber is maintained at about 40–60 sccm and $H_2$ flow rate is maintained at about 25–45 slm.

The uniform SiGeC layer 620 is then formed by CVD over the first graded SiGeC layer 618 (step 574, FIG. 5(d)). Processor 110 controls the flow of silane, germane, methylsilane and hydrogen using mass flow controllers 160, 161, 162 and 164, respectively. In one embodiment, processor 110 uses the growth rate curves calculated in step 720 (as discussed above in connection with FIGS. 7A, 7B) to determine the flow rates of silane 130, germane/$H_2$ 131, and methylsilane/$H_2$ 132 for a desired film thickness and Ge and C concentrations. Preferably, the hydrogen flow rate remains constant throughout the deposition and is in the range of about 5 to 70 slm. Processor 110 uses the growth rates obtained for SiGeC having a given Ge and C concentrations to determine the duration of this step.

The Ge and C concentration in the uniform layer 620 remains constant, typically about 5% Ge and 0.5% C. Preferably, the Ge and C concentrations in the uniform layer 620 matches the Ge and C concentrations, respectively, of the first and the second graded layers, 618 and 622, at interfaces B and C, respectively. (See FIG. 2A) In other embodiments, the Ge and C concentrations in the uniform layer 620 may be higher than the Ge and C concentrations, respectively, of the graded layers 618 and 622 at interfaces B and C, respectively. In this case, the index of refraction of the uniform layer 620 is higher than that of both the first and second graded layers 618 and 622. In one embodiment, the thickness of the uniform layer is in the range of about 2–5 $\mu$m, which is grown at a rate of about 220 Å/min.

Next, the surface of the deposited uniform layer 620 is planarized to remove those portions of the uniform layer 620, the graded layer 618 and the blocking layer 616 that lie above the plane of surfaces 610, 612. (Step 576, FIG. 5(e)). Such planarization may be accomplished, for example, by chemical mechanical polishing. Before performing the planarizing step, the substrate 210 is cooled and removed from the deposition chamber 12. After planarizing, the surface of the substrate 210 is cleaned using the process described in step 520. Steps 530, 540, 550, and 560 are then performed. In another embodiment, the uniform layer 620 fills only region 630 and has a flat top surface similar to surface 632 shown in FIG. 5(e). In this case, planarization is not needed.

Next, a second graded SiGeC layer 622 is formed by CVD over uniform layer 620 (Step 578, FIG. 5(f)). The second graded layer 622 is formed using a technique similar to that described in step 572 for forming the first graded layer 618. The gas flow rates of relative concentrations are adjusted such that the Ge and C concentrations in the second graded layer 622 decrease with the height of the second graded layer 622. In one embodiment, the Ge and C concentration profile in the second graded layer 622 is linear. However, other concentration profiles, such as those illustrated in FIG. 3(d)–(f) are also contemplated.

During step 578, the germane mixture and methylsilane mixture flow rates are decreased from predetermined flow rates to 0 sccm depending on the desired concentration gradient. Preferably, the Ge and C concentration in layer 622 decreases at a rate of approximately 10% per micron until the final Ge and C concentrations of 0% is achieved, resulting in a second graded layer 622 that is about 0.2–0.4 $\mu$m. Preferably, the $SiH_4$ flow rate into the deposition chamber is maintained at about 50 sccm and the $H_2$ flow rate is maintained at about 30–40 slm.

The second graded layer 622 is then etched to remove the SiGe deposited on surfaces 610 and 612. (Step 580, FIG. 5(g)). Again, the substrate is cooled and removed from the deposition chamber 12. After etching, the surface of the wafer is cleaned using the process described in step 520. Steps 530, 540, 550 and 560 are then performed and an upper cladding layer 624 is deposited over the second graded layer 622 using the same process conditions as used for forming layer 618. (Step 582, FIG. 5(h)). The cladding layer is then planarized if needed. (Step 584, FIG. 5(i)).

For embodiments that contain only the graded layers and do not contain the uniform layer, steps 574 and 576 are not performed. For embodiments that contain only the uniform layer and do not include the first or second graded layers, steps 572, 578 and 580 are not performed. For the embodiments that do not include an upper cladding layer 624, steps 582 and 584 are not performed. And for embodiments that do not have a blocking layer 616, step 570 is not performed.

Figure 9:
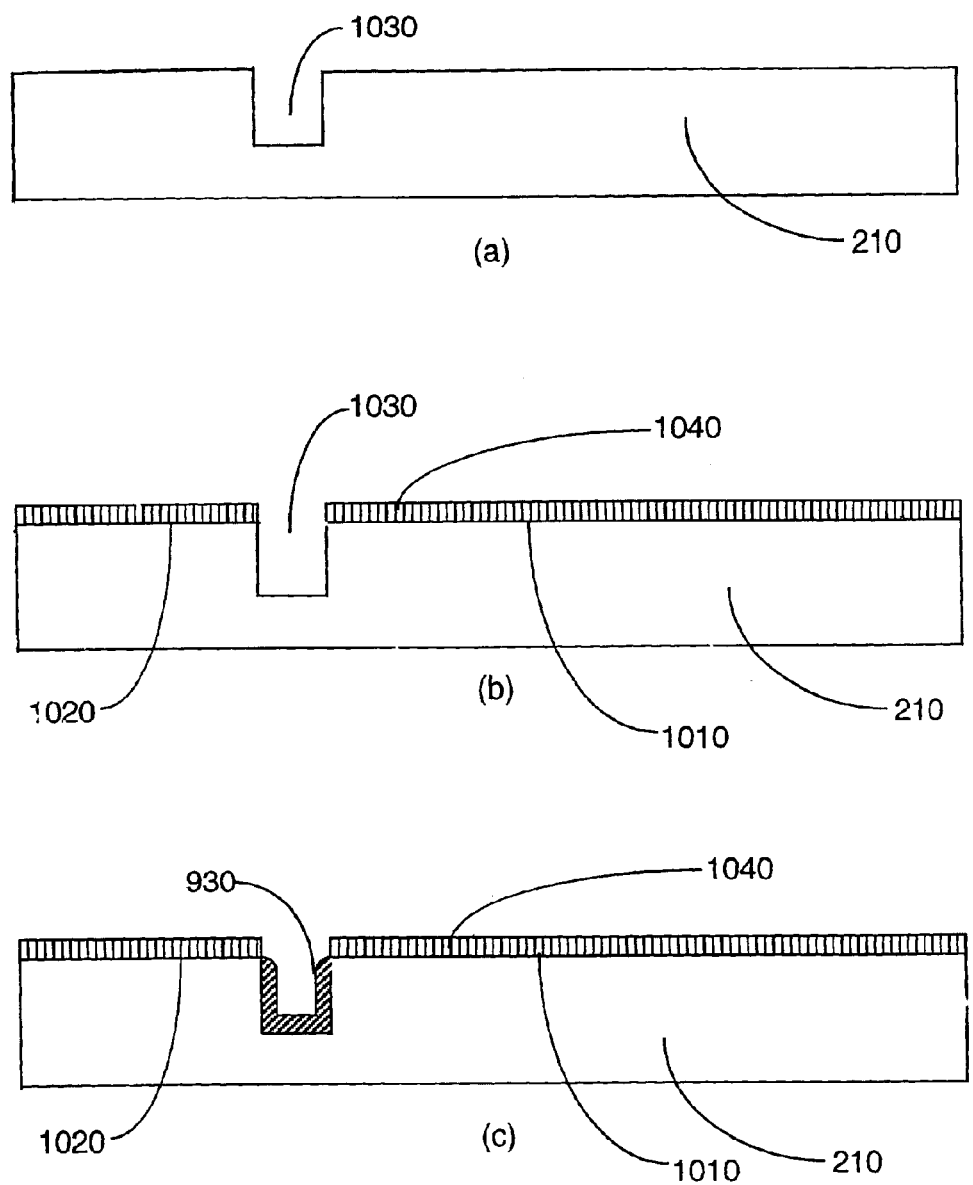
FIG. 9 illustrates a selective deposition technique for fabricating waveguide structures in accordance with an embodiment of the invention.
Figure 9:
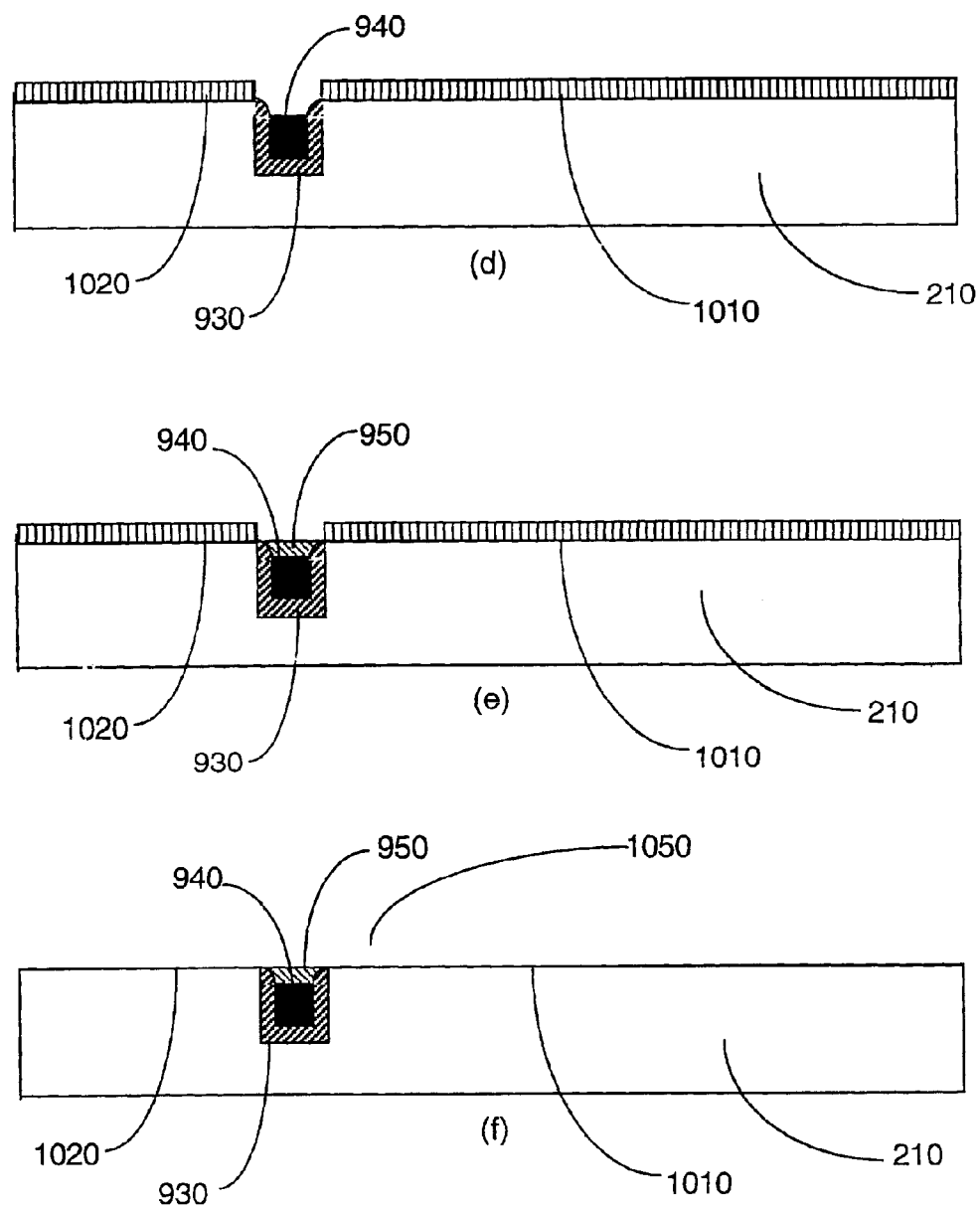

FIG. 9 illustrates a selective CVD deposition technique for fabricating waveguide structures in accordance with another embodiment of the invention. Generally, in a selective CVD deposition technique, the deposition occurs only on certain regions of the substrate. This is achieved by depositing an oxide layer 1040 on regions where deposition is not needed.

An etchant gas, such as hydrogen chloride, is introduced into the deposition chamber either as a separate source gas or in a mixture with another source gas during the deposition process. The etchant gas removes the deposited layer as it is formed on the substrate. The etch rate and the deposition rate for regions covered by the oxide layer are not the same as the etch rate and the deposition rate for regions not covered by the oxide layer. Thus, selecting the growth conditions such that the deposition rate is lower than the etch rate on the oxide surfaces while the deposition rate is higher than the etch rate on the non-oxide surfaces, results in film deposition only on regions that are not covered by the oxide layer.

For example, to deposit a layer of SiGeC only in region 1030 (FIG. 9), surfaces 1010 and 1020 are covered with a silicon dioxide (oxide) or silicon nitride (nitride) layer 1040.

The growth conditions are selected such that the rate of deposition of SiGeC on the oxide or nitride covered surfaces 1010 and 1020 is lower than the rate at which the deposited SiGeC is etched from surfaces 1010 and 1020 by chlorine based chemicals such as hydrogen chloride. Further, the growth conditions are selected such that the deposition rate of SiGeC in region 1030 is higher than the rate at which SiGeC is etched in region 1030. This results in a SiGeC deposition in region 1030 and no SiGeC deposition on surfaces 1010 and 1020.

To form a waveguide structure in accordance with the invention, an oxide or nitride layer is formed on a silicon substrate, and a pattern is etched through the oxide or nitride layer and into the substrate 210 using commonly known techniques in the art. An oxide or nitride layer 1040 remains on surfaces where either Si or SiGeC deposition is not needed, e.g. surfaces 1010 and 1020 of the patterned etched substrate. (FIG. 9(b)). The oxide or nitride layer 1040 allows deposition in region 1030 without deposition on surfaces 1010 and 1020.

Next, the substrate 210 is cleaned as described in step 520. (FIG. 5). Steps 530 thru 550 are then performed as described earlier. The first graded layer 930, the uniform layer 940, and the second graded layer 950 are then deposited in region 1030 using the techniques described earlier in steps 572, 574, and 578, respectively. (FIG. 5 and FIGS. 9(c)–9(e)).

Preferably, the source gases for the formation of the waveguide structure are germane, methylsilane, dichlorosilane, hydrogen chloride, and hydrogen. The relative concentrations of these gases, the temperature and the pressure are selected such that the deposition rate of Si and SiGeC in regions 1010 and 1020 is lower than the etch rates of Si and SiGeC in those regions while the deposition rate of Si or SiGeC in region 1030 is higher than the etch rate of Si or SiGeC in region 1030. After the waveguide structure is deposited, the oxide or nitride layer 1040 is removed using techniques known in the art (FIG. 9(f)).

Although the embodiment shown in FIG. 9 does not show a blocking layer or an upper cladding layer, those skilled in the art will appreciate that embodiments containing the blocking and cladding layers in addition to the first graded layer 1060, the uniform layer 1062 and the second graded layer 1064 may be formed using the process described above. For embodiments that contain only the graded layers 1060 and 1064 and not the uniform layer 1062, steps 574 and 576 are not performed. For embodiments that contain only the uniform layer 1062 and do not include the first or second graded layers 1060 and 1064, steps 572, 578 and 580 are not performed. For embodiments that do not include an upper cladding layer, steps 582 and 584 are not performed. And for embodiments that do not have a blocking layer, step 570 is not performed.

Figure 10:
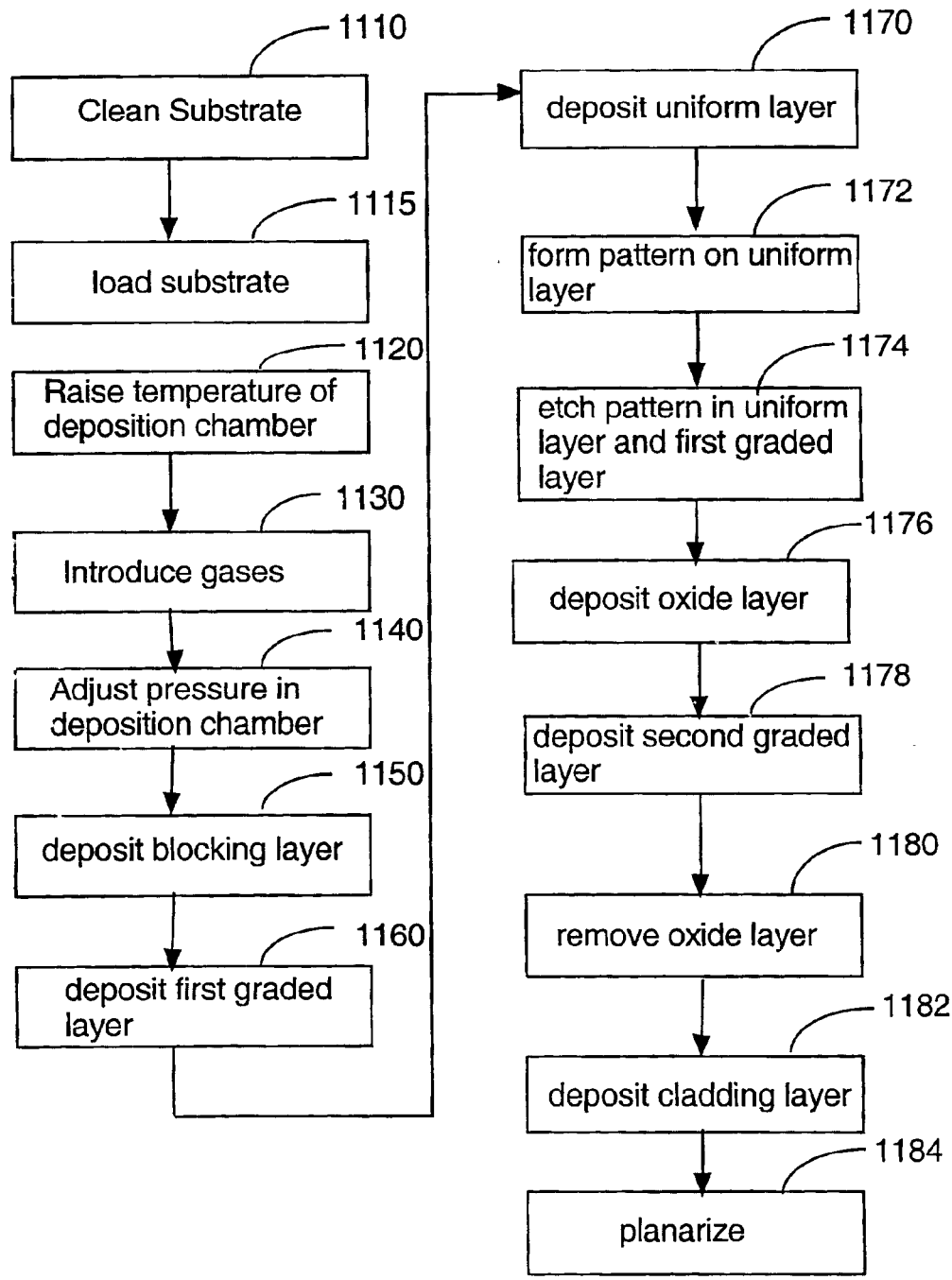
FIG. 10 is a flow chart of the processing steps used to fabricate a waveguide structure using another embodiment of the invention.
Figure 11:
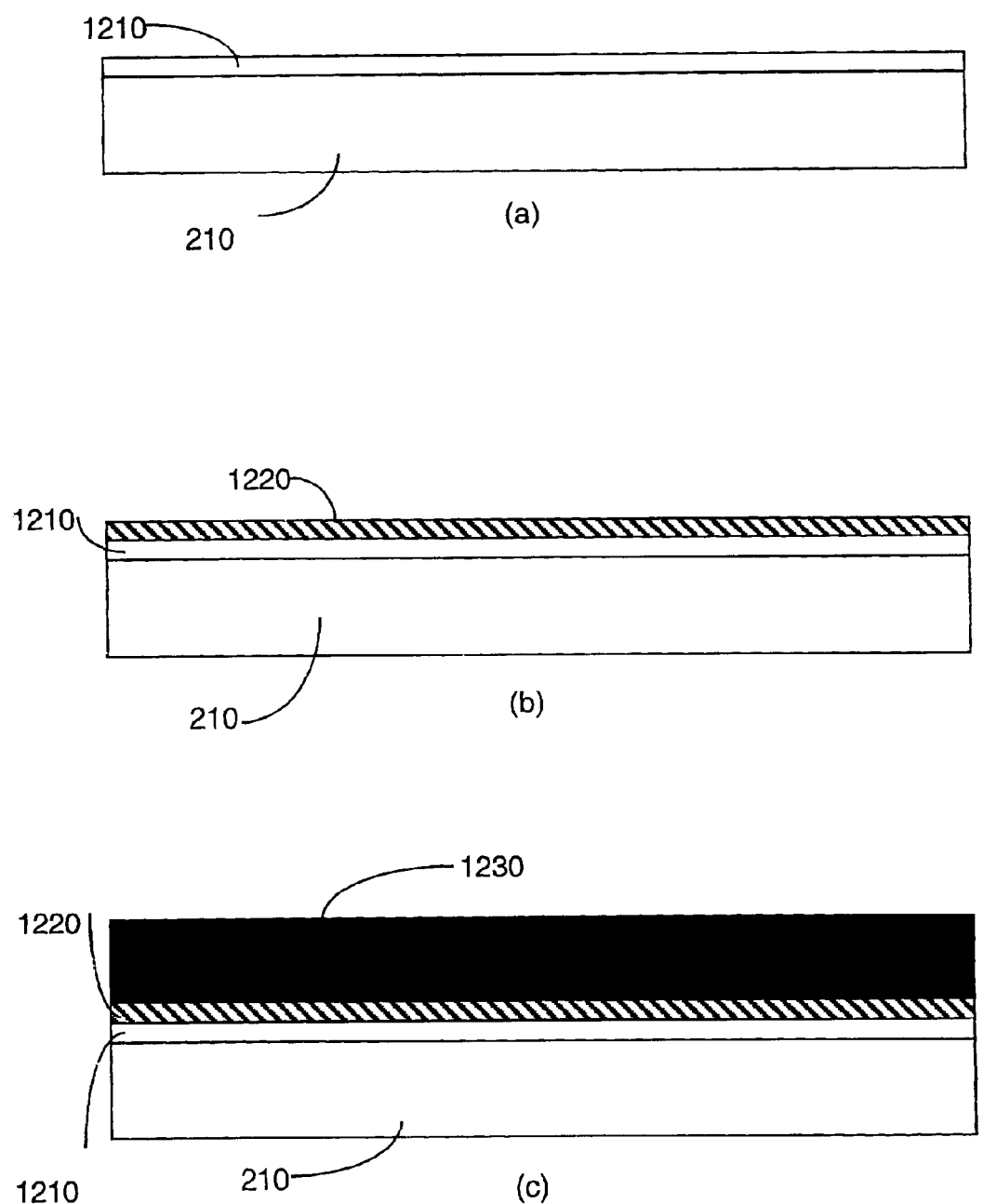
FIG. 11 illustrates schematic cross sections of the waveguide structure at some of the processing steps of FIG. 10.
Figure 11:
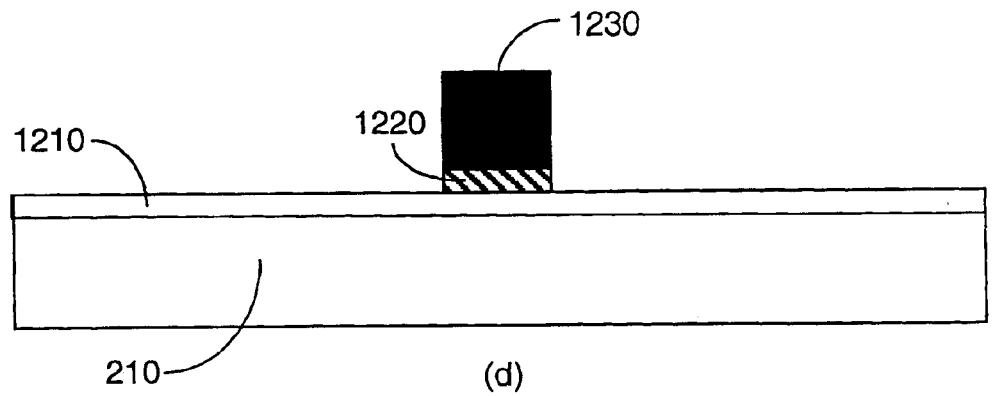
Figure 11:
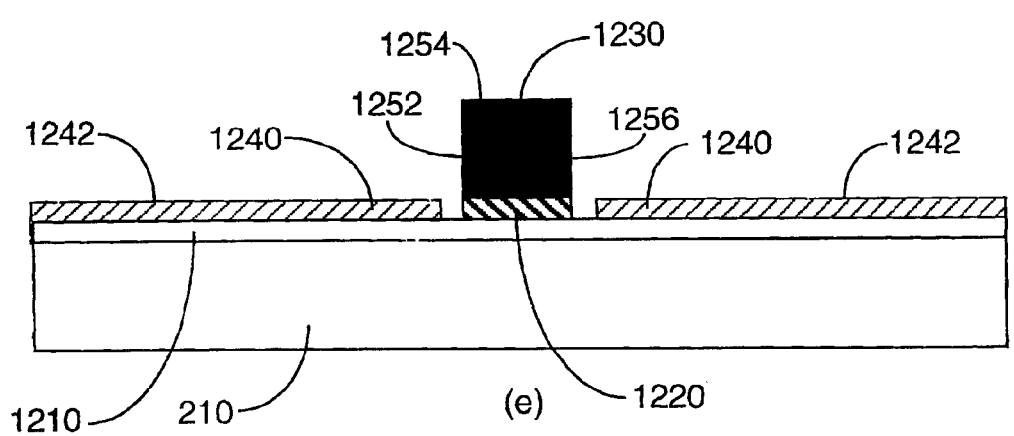
Figure 11:
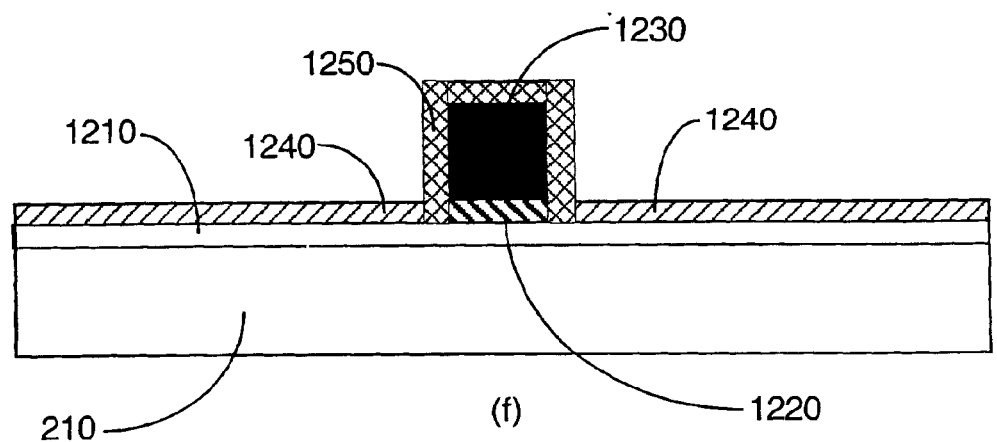
Figure 11:
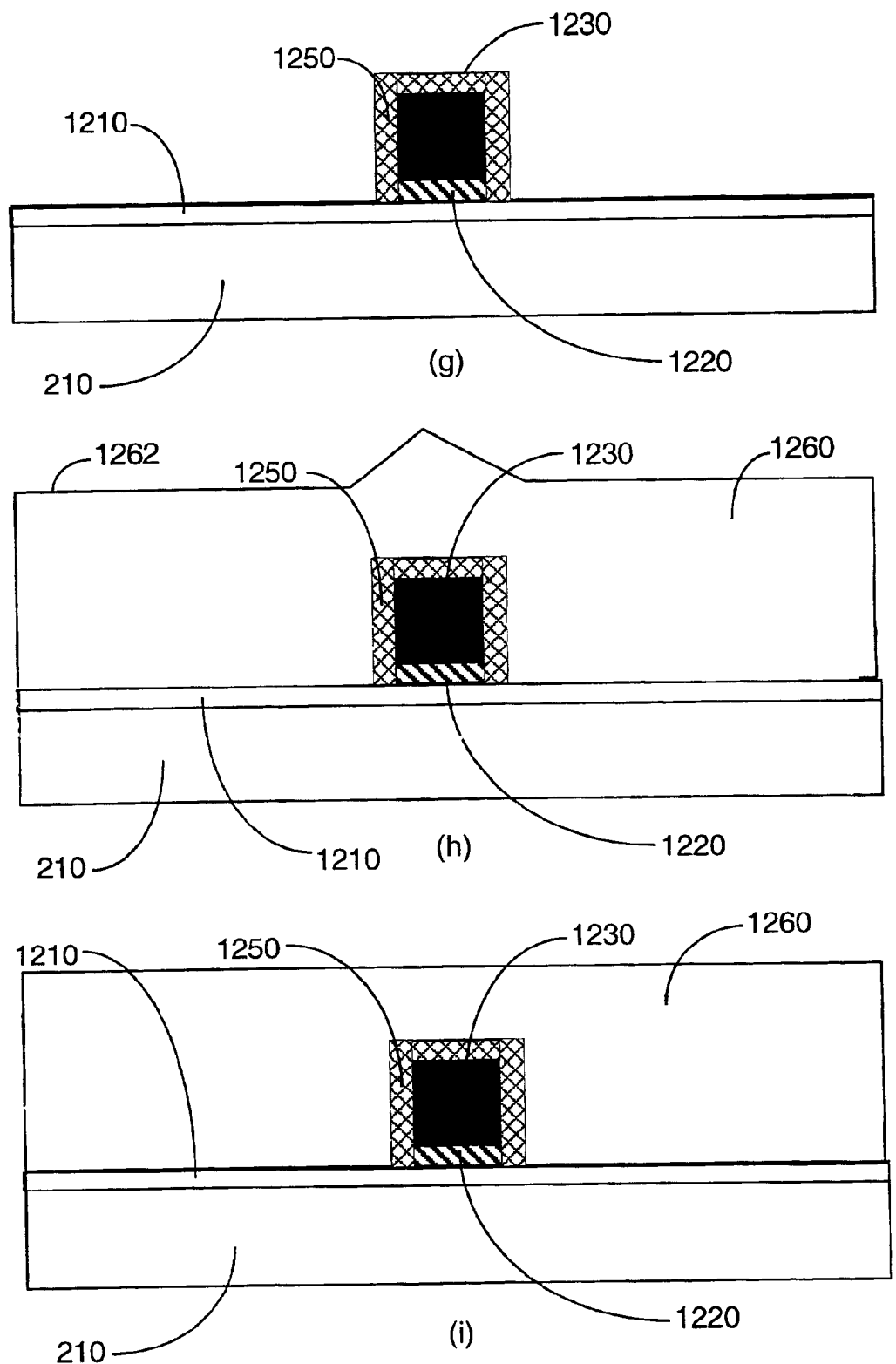

FIGS. 10 and 11 illustrate another technique for fabricating waveguide structures in accordance with the invention. FIG. 10 shows the processing steps that may be executed to form a waveguide structure. FIG. 11 illustrates schematic cross sections of the waveguide structure at some of the processing steps of FIG. 10. Steps 1110–1140 are performed using similar techniques as described in steps 510–560 of FIG. 4. A blocking layer 1210 is next deposited on substrate 210 using CVD. (Step 1150, FIG. 11(a)). A first graded layer 1220 is then formed over the blocking layer 1210. (Step 1160, FIG. 11(b)). Next, the uniform layer 1230 is formed on the first graded layer 1220. (Step 1170, FIG. 11(c)). The methods for forming the blocking layer 1210, the first graded layer 1220 and the uniform layer 1230 are similar to those described earlier in connection with FIGS. 5 and 6.

After the uniform layer 1230 is formed, the substrate 210 is cooled and removed from chamber 12. A pattern is formed over the uniform layer 1230 using techniques known in the art. (Step 1172). The uniform layer 1230 and the first graded layer 1220 are then etched using techniques known in the art. (Step 1174, FIG. 11(d)). The etched patterned substrate is then cleaned using techniques similar to those described earlier in step 520 (FIG. 4) and placed in chamber 12. Steps 1115–1140 are performed again. An oxide or nitride layer 1240 is next deposited over blocking layer 1210 as shown in FIG. 11(e). (Step 1176). The oxide or nitride layer 1240 can be formed by depositing an oxide or nitride layer on the wafer and removing portions of the oxide or nitride layer surrounding layers 1230 and 1220.

A second graded layer is then formed around the uniform layer 1230 and graded layer 1220 as shown in FIG. 11(f). (Step 1178). The flow rates of the gases (silane, germane, hydrogen and hydrogen chloride), the temperature, and the pressure are selected such that the second graded layer 1250 is only formed around surfaces 1252, 1254, and 1256 (FIG. 11(e)). The deposition rate on surfaces 1252, 1254, and 1256 is higher than the etch rate on those surfaces. Additionally, the flow rates of the gases (silane, germane, methylsilane, hydrogen and hydrogen chloride), the temperature, and the pressure are selected such that a second graded layer is not formed on oxide or nitride surfaces 1242 by selecting these parameters so that the deposition rate on surfaces 1242 is lower than the etch rate on surfaces 1242.

The oxide or nitride layer 1240 is then removed using techniques known in the art. (Step 1180, FIG. 11(g)). A cladding layer 1260 is then formed over the second graded layer 1250 and the blocking layer 1210, as shown in FIG. 11(h). (Step 1182). The surface of the cladding is then planarized to form the structure shown in FIG. 11(i). In other embodiments, the planarization step may not be necessary where the cladding layer is grown so as to form a flat surface 1262 (see FIG. 11(h)) or where a flat surface 1262 is not required.

For embodiments that contain only the graded layers and not the uniform layer, step 1170 is not performed. In this embodiment, steps 1172 and 1174 are performed immediately after step 1160. For embodiments that contain only the uniform layer 1230 and do not include the first or second graded layers 1220 and 1250, steps 1160, 1176, 1178 and 1180 are not performed. For the embodiments that do not include an upper cladding layer 1260, steps 1182 and 1184 are not performed. And for embodiments that do not have a blocking layer 1210, step 1150 is not performed.

Figure 12:
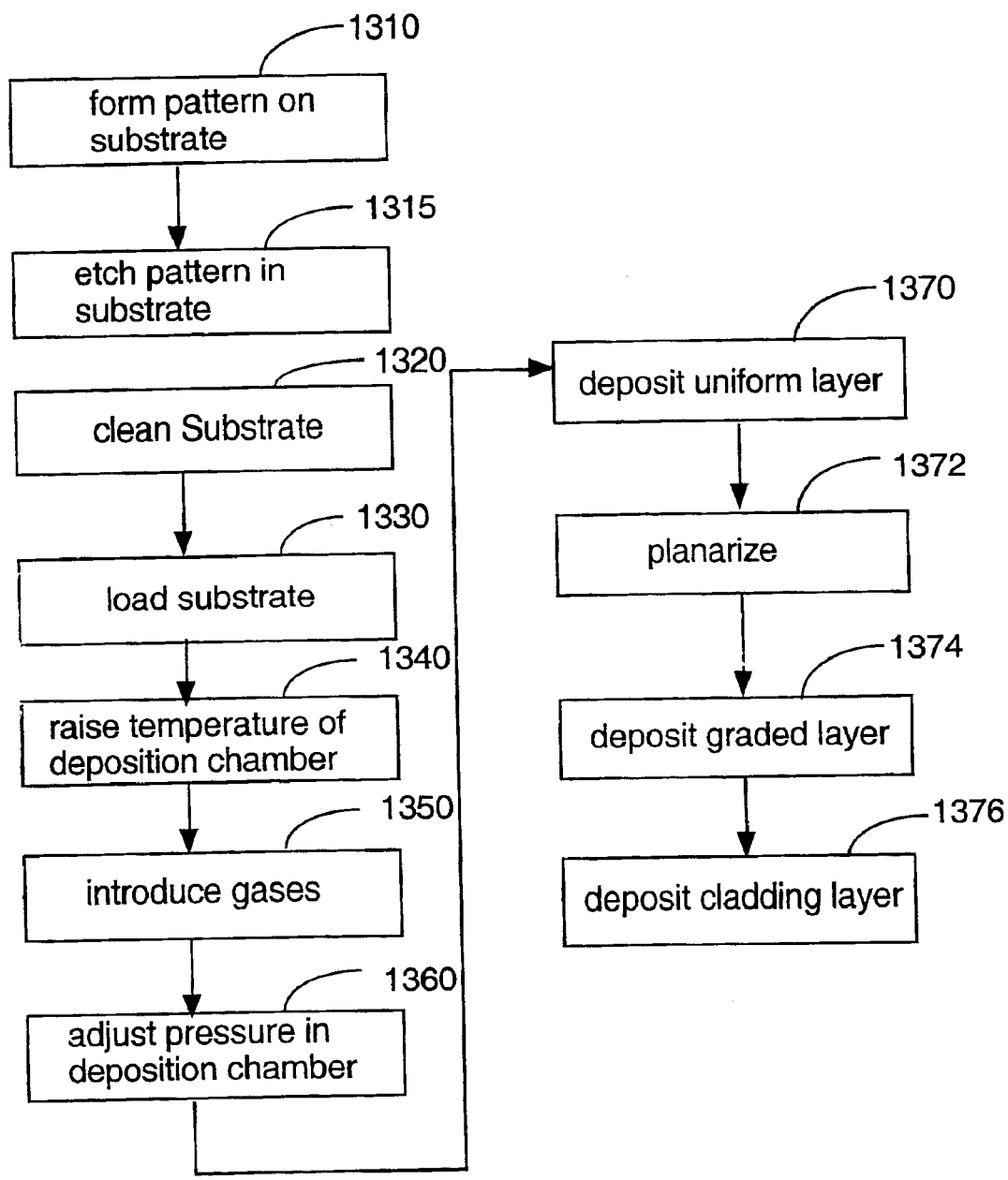
FIG. 12 is a flow chart of the processing steps used to fabricate a waveguide structure using yet another embodiment of the invention.
Figure 13:
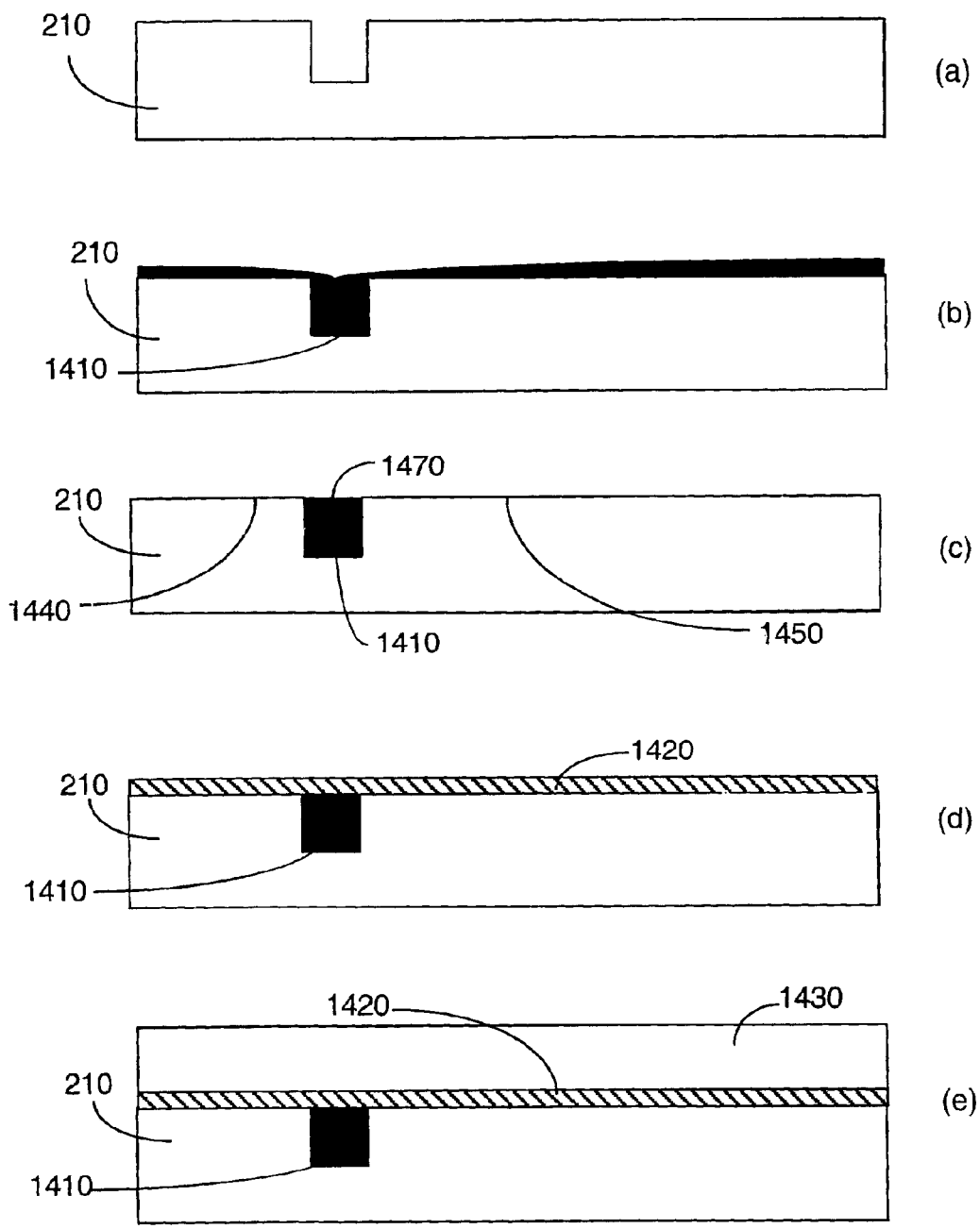
FIG. 13 illustrates schematic cross sections of the waveguide structure at some of the processing steps of FIG. 12.

FIGS. 12 and 13 illustrate yet another technique for fabricating waveguide structures in accordance with the invention. FIG. 12 shows the processing steps that are executed to form a waveguide structure in accordance with this embodiment. FIG. 13 illustrates schematic cross sections of the waveguide structure at some of the processing steps of FIG. 12. Steps 1310–1360 are performed using techniques similar to those described in steps 510–560 in connection with FIG. 4. Next, a uniform layer 1410 is formed epitaxially by CVD on substrate 210. (Step 1370, FIG. 13(b)). The method for forming the uniform layer 1410 is similar to that described earlier in step 574 in connection with FIGS. 4 and 5.

After the uniform layer 1410 is formed, the substrate 210 is cooled and removed from chamber 12. The surface of the deposited uniform layer 1410 is then planarized to remove those portions of the uniform layer 1410 that lie above the plane of surfaces 1440 and 1450. (Step 1372, FIG. 13(c)). Such planarization may be accomplished using techniques commonly known in the art, such as, chemical mechanical polishing. After planarizing, the surface of the substrate 210 is cleaned using the process described earlier in step 520. Steps 1330, 1340, 1350, and 1360 are then performed. In another embodiment, the uniform layer 1410 is formed by filling only region 1460 and has a flat top surface similar to surface 1470 shown in FIG. 13(c). In this case, planarization is not needed.

A graded layer 1420 is then formed epitaxially by CVD over uniform layer 1410 as shown in FIG. 13(d). (Step 1374). The method for forming the graded layer 1420 is similar to that described earlier in step 578 in connection with FIGS. 4 and 5. The gas flow rates of relative concentrations of silane, germane and methylsilane are adjusted such that the Ge and C concentrations in the graded layer 1420 decreases with the height of the graded layer 1420. In one embodiment, the Ge and C concentration profiles in the graded layer 1420 are linear. However, other concentration profiles, such as those illustrated in FIG. 3(d)–(f) are also contemplated.

Next, a cladding layer 1430 is formed epitaxially by CVD over the second graded layer 1420. (Step 1376). The method for forming the cladding layer 1430 is similar to that described earlier in step 582 in connection with FIGS. 4 and 5.

The structure described immediately above does not include a transition layer between the substrate 210 and the uniform layer 1410. The concentrations of Ge and C almost instantaneously increase from about 0% in the substrate 210 to their percentages (typically, about 2–5% for Ge and 0.18–0.5% for carbon) in uniform layer 1410. In this case, the growth conditions, i.e. desired temperature, pressure and concentrations of constituent gases for achieving the desired Ge and C concentrations are established almost instantaneously.

Other embodiments may include a transition layer formed epitaxially between the substrate 210 and the uniform layer 1410, such as a transition layer similar to the first graded layer 618 described earlier in connection with FIG. 4 (step 572) and FIG. 5(e). In one embodiment, the gradient of the layer is such that the concentrations of Ge and C increase from about 0% to about 2–5% for Ge and 0.18–0.5% for C at a rate of about 10% per $\mu$m, forming a transition layer that is about 0.2–0.5 $\mu$m thick. During formation, the flow rate of source gas 131 and 132 is gradually increased, such that the Ge concentration in the transition layer increases at a rate of about 10% per $\mu$m while the C concentration remain in proportion to the Ge concentration.

In yet other embodiments, the Ge and C concentrations may increase very rapidly, forming a very thin transition layer, e.g. the transition layer, for example, may be only about 0.01 $\mu$m to about 0.05 $\mu$m thick. For example, to form a 0.01 $\mu$m thick transition layer where the Ge and C concentrations increase from about 0% to about 2% for Ge and 0.2% for C, the Ge concentration in the transition layer must increase at a rate of about 200% per $\mu$m while the C concentration keeps in proportion to the Ge concentration. This is achieved by increasing the flow rate of source gas 131 and 132 very rapidly.

Similarly, in one embodiment, the Ge and C concentrations in the graded layer 1420 may be decreased very rapidly in a manner similar to that described immediately above for the transition layer. In this case, the graded layer 1420 is very thin and may be only 0.01 $\mu$m to 0.05 $\mu$m thick.

In yet another embodiment, the waveguide structure may be formed by forming the cladding layer 1430 immediately over the uniform layer 1410. In this case, the structure does not include a graded layer 1420 and step 1374 is not performed. The Ge and C concentration profiles are similar to that shown in FIG. 3(b). That is, the Ge and C concentration immediately decreases from their percentages in the uniform layer 1410 to 0% in the upper cladding 1430.

While the present invention has been described with reference to a few specific embodiments, the description is illustrative of the invention and is not to be construed as limiting the invention. For example, the waveguide structure disclosed is a SiGeC waveguide structure but those skilled in the art can appreciate that the processes disclosed may be employed for waveguide structures made of other materials. Further, various modifications of the structures described may occur to those skilled in the art without departing from the true spirit and scope of the invention as defined by the appended claims.

What is claimed is:

1. A method of forming a waveguide structure, comprising:
   forming a first graded layer on a substrate, the first graded layer comprising silicon, germanium, and a lattice constant adjusting material, wherein concentrations of germanium and the lattice constant adjusting material increase with the height of the first graded layer; and
   forming a second graded layer above the first graded layer, the second graded layer comprising silicon, germanium, and the lattice constant adjusting material, wherein concentrations of germanium and the lattice constant adjusting material decrease with the height of the second graded layer.

2. The method of claim 1, further comprising:
   forming a uniform layer on the first graded layer before forming the second graded layer, the uniform layer comprising silicon, germanium, and the lattice constant adjusting material, wherein concentrations of germanium and the lattice constant adjusting material remain substantially constant throughout the uniform layer.

3. The method of claim 1 wherein the lattice constant adjusting material is carbon.

4. The method of claim 3 wherein the germanium and carbon concentrations in the first graded layer increase linearly with height.

5. The method of claim 3 wherein the germanium concentration in the first graded layer increases from about 0% germanium to about 2–5% germanium at a rate between about 0.1% per $\mu$m to about 10% per $\mu$m, and the carbon concentration at any point in the first graded layer is about 10% of the germanium concentration.

6. The method of claim 3 wherein the germanium concentration in the first graded layer increases from about 0% germanium to about 2% germanium at a rate of about 10% per $\mu$m, and the carbon concentration at any point in the first graded layer is about 10% of the germanium concentration.

7. The method of claim 3 wherein the germanium and carbon concentrations in the second graded layer decrease linearly with height.

8. The method of claim 3 wherein the germanium concentration in the second graded layer decreases from about 2–5% germanium to about 0% germanium at a rate between about 0.1% per $\mu$m to about 10% per $\mu$m, and the carbon concentration is about 10% of the germanium concentration.

9. The method of claim 3 wherein the germanium concentration in the second graded layer decreases from about 2% germanium to about 0% germanium at a rate of about 10% per $\mu$m, and the carbon concentration at any point in the first graded layer is about 10% of the germanium concentration.

10. The method of claim 3 wherein the germanium concentration in the uniform layer is in the range of about 2–5%, and the carbon concentration in the uniform layer is about 10% of the germanium concentration.

11. The method of claim 3 wherein the germanium concentration in the uniform layer is approximately 2%, and the carbon concentration in the uniform layer is about 10% of the germanium concentration.

12. The method of claim 2 wherein the thickness of the uniform layer is about 2–5 $\mu$m.

13. The method of claim 2 further comprising forming a blocking layer on the substrate prior to forming the first graded layer such that the blocking layer is between the substrate and the first graded layer and prevents contaminants in the substrate from diffusing into the first, the uniform, or the second graded layers.

14. The method of claim 13 wherein the substrate is a silicon substrate and the blocking layer comprises epitaxial silicon.

15. The method of claim 2, wherein the substrate has an etched pattern, and the method further comprises:
    planarizing the uniform layer prior to forming the second graded layer.

16. The method of claim 2 further comprising forming a cladding layer on the second graded layer.

17. The method of claim 16 wherein the cladding layer comprises epitaxial silicon.

18. The method of claim 2 wherein the first, the uniform, and the second graded layers are formed by chemical vapor deposition processes.

19. The method of claim 18 wherein the first, the uniform, and the second graded layers are formed epitaxially on a semiconductor substrate and the chemical vapor deposition process for forming the first layer, the uniform layer, or the second layer comprises:
    loading the substrate on a susceptor in a vacuum chamber;
    while controlling a pressure in the vacuum chamber at a level below 760 Torr and maintaining the temperature in the vacuum chamber at a level between about 500–1200° C., introducing into the vacuum chamber a plurality of gases including a silicon gas selected from the group consisting of silane, disilane, trisilane, dichlorosilane, trichlorosilane, and their mixtures with each other and with hydrogen, a germanium gas selected from the group consisting of germane, digermane, and their mixtures with each other and with hydrogen, and a carbon gas selected from the group consisting of methylsilane or its mixture with hydrogen.

20. The method of claim 19 wherein the plurality of gases further includes a dilutant gas.

21. The method of claim 18 wherein the chemical vapor deposition process for forming the first, second or uniform layer comprises
    determining desired Ge concentration profile and desired layer thickness;
    determining flow rates of a plurality of gases; and
    introducing into the deposition chamber the plurality of gases according to the determined flow rates while maintaining a pre-determined pressure and temperature in the deposition chamber.

22. The method of claim 21 wherein the plurality of gases comprise a first gas selected from the group consisting of silane, disilane, trisilane, dichlorosilane, and trichlorosilane, a second gas selected from the group consisting of germane, germane in hydrogen, digermane, and digermane in hydrogen, and a third gas selected from the group consisting of methylsilane, and methylsilane in hydrogen.

23. The method of claim 21 wherein the chemical vapor deposition process further comprises
    adjusting the flow rates of the second and third gases during the growth of the first and the second graded layer.

24. The method of claim 21 wherein determining the flow rates of a plurality of gases further comprises:
    obtaining experimental data of germanium concentration as a function of the flow rate of a first gas among the plurality of gases;
    obtaining experimental data of carbon concentration as a function of the flow rate of a second gas among the plurality of gases; and
    calculating the flow rates of the first and second gases based on the obtained experimental data and the desired concentration profile.

25. The method of claim 24, wherein the experimental data of germanium and carbon concentrations are obtained by experimental measurements on films formed on test wafers and curve fitting.

26. The method of claim 1 wherein a portion of the substrate is covered with a layer of film and the first graded layer is selectively deposited on a selected portion of the substrate not covered by the layer of film.

27. The method of claim 26 wherein the substrate is a silicon substrate and the layer of film comprises oxide or nitride.

28. The method of claim 2 wherein a portion of the uniform layer and the first graded layer is etched away prior to the formation of the second graded layer.

29. The method of claim 2 wherein the waveguide structure is planar.

30. A method of forming a waveguide structure, comprising:
    providing a substrate having an etched pattern;
    forming a uniform layer on the substrate such that the uniform layer fills the etched pattern, the uniform layer containing silicon, germanium and a lattice constant adjusting material wherein concentrations of germanium and the lattice constant adjusting material remain substantially constant in the uniform layer; and
    planarizing the uniform layer.

31. The method of claim 30 wherein the lattice constant adjusting material is carbon.

32. The method of claim 31 wherein the germanium concentration in the uniform layer is in the range of about 2–5%, and the carbon concentration in the uniform layer is about 10% of the germanium concentration.

33. The method of claim 32 wherein the germanium concentration in the uniform layer is approximately 2%, and the carbon concentration in the uniform layer is about 10% of the germanium concentration.

34. The method of claim 31 wherein the thickness of the uniform layer is in the range of about 2–5 $\mu$m.

35. The method of claim 31 wherein the uniform layer is formed on a first graded layer formed in the etched pattern of the substrate prior to the formation of the uniform layer, the first graded layer comprising silicon, germanium and carbon wherein the germanium and carbon concentrations increase with the height of the first graded layer while the carbon concentration remains in proportion to the germanium concentration.

36. The method of claim 35 wherein the germanium and carbon concentrations in the first graded layer increase linearly while the carbon concentration remains in proportion to the germanium concentration.

37. The method of claim 31 further comprising:
forming a second graded layer on the uniform layer, the second graded layer comprising silicon, germanium and carbon wherein the germanium and carbon concentrations decrease with the height of the first graded layer while the carbon concentration remains in proportion to the germanium concentration.

38. The method of claim 37 wherein the germanium and carbon concentrations in the second graded layer decrease linearly while the carbon concentration remains in proportion to the germanium concentration.

39. The method of claim 30 wherein a blocking layer is formed on the substrate prior to the formation of the uniform layer.

40. The method of claim 39 wherein the blocking layer is epitaxial silicon.

41. The method of claim 31 further comprising forming a cladding layer on the uniform layer.

42. The method of claim 41 wherein the cladding layer is epitaxial silicon.

43. The method of claim 31 wherein the uniform layer is formed by a chemical vapor deposition process.

44. The method of claim 43 wherein the uniform layer is formed epitaxially on a semiconductor substrate and the chemical vapor deposition process for forming the uniform layer comprises:
loading the substrate on a susceptor in a vacuum chamber:
while controlling a pressure in the vacuum chamber at a level below 760 Torr and maintaining the temperature in the vacuum chamber at a level between about 500–1200° C., introducing into the vacuum chamber a plurality of gases including a silicon gas selected from the group consisting of silane, disilane, trisilane, dichlorosilane, trichlorosilane, and their mixtures with each other and with hydrogen, a germanium gas selected from the group consisting of germane, digermane, and their mixtures with each other and with hydrogen, and a carbon gas selected from the group consisting of methylsilane or its mixture with hydrogen.

45. The method of claim 44 wherein the plurality of gases further includes a dilutant gas.

46. The method of claim 43 wherein the chemical vapor deposition process comprises
determining desired germanium and carbon concentration for the uniform layer;
determining flow rates of a plurality of gases; and
introducing into the deposition chamber the plurality of gases according to the determined flow rates while maintaining a predetermined pressure and temperature in the deposition chamber.

47. The method of claim 46 wherein the plurality of gases comprise a first gas selected from the group consisting of silane, disilane, trisilane, dichlorosilane, and trichlorosilane, a second gas selected from the group consisting of germane, germane in hydrogen, digermane, and digermane in hydrogen, and a third gas selected from the group consisting of methylsilane, and methylsilane in hydrogen.

48. The method of claim 47 wherein determining the flow rates of a plurality of gases further comprises:
obtaining experimental data of germanium concentration as a function of the flow rate of a first gas among the plurality of gases;
obtaining experimental data of carbon concentration as a function of the flow rate of a second gas among the plurality of gases; and
calculating the flow rates of the first and second gases based on the obtained experimental data and the desired germanium and carbon concentrations.

49. The method of claim 48, wherein the experimental data of germanium and carbon concentrations are obtained by experimental measurements on films formed on test wafers and curve fitting.

50. A method of forming a waveguide structure, comprising
providing a substrate, a first portion of the substrate being covered by a layer of material different from that of the substrate;
selectively depositing a first graded SiGeC layer on a second portion of the substrate not covered by the layer of material;
selectively depositing a uniform SiGeC layer on the first graded SiGeC layer; and
selectively depositing a second graded SiGeC layer on the uniform SiGeC layer;
wherein germanium and carbon concentrations in the first graded layer increase with height while germanium and carbon concentrations in the second graded layer decrease with height.

51. The method of claim 50, wherein at least the second portion of the substrate is covered by a blocking layer prior to the deposition of the first graded layer layer.

52. The method of claim 50 wherein each selectively depositing step further comprises:
providing a plurality of deposition gases for depositing a SiGeC layer;
providing at least one etchant gas for removing the SiGeC layer as it is being deposited; and
wherein the SiGeC layer is being removed faster than it is deposited on the first portion of the substrate, and the SiGeC layer is being deposited faster than it is removed on the second portion of the substrate.

53. The method of claim 52 wherein the plurality of depositing gases comprise a first gas selected from the group consisting of silane, disilane, trisilane, dichlorosilane, and trichlorosilane, a second gas selected from the group consisting of germane, germane in hydrogen, digermane, and digermane in hydrogen, and a third gas selected from the group consisting of methylsilane, and methylsilane in hydrogen.

54. The method of claim 52 wherein the at least one etchant gas comprises hydrogen chloride.

55. The method of claim 50 wherein the waveguide structure is planar.

56. A waveguide made by a process comprising the steps of:
forming a first graded layer on a substrate, the first graded layer comprising silicon, germanium, and carbon, wherein concentrations of germanium and carbon increase with the height of the first graded layer;
forming a uniform layer on the first graded layer, the uniform layer comprising silicon, germanium, and carbon; and
forming a second graded layer on the uniform layer, the second graded layer comprising silicon, germanium, and carbon, wherein concentrations of germanium and carbon decrease with the height of the first graded layer.

57. A waveguide made by a process comprising the steps of:
providing a substrate having an etched pattern;
forming a uniform layer on the substrate such that the uniform layer fills the etched pattern, the uniform layer containing silicon, germanium and carbon wherein concentrations of germanium and carbon remain constant in the uniform layer; and planarizing the uniform layer.

58. A waveguide made by a process comprising the steps of:

providing a substrate, a first portion of the substrate being covered by a layer of material different from that of the substrate;

selectively depositing a first graded SiGeC layer on a second portion of the substrate not covered by the layer of material;

selectively depositing a uniform SiGeC layer on the first graded SiGeC layer; and selectively depositing a second graded SiGeC layer on the uniform SiGeC layer;

wherein germanium and carbon concentrations in the first graded layer increase with height while germanium and carbon concentrations in the second graded layer decrease with height.

59. A waveguide structure comprising:

a first graded layer on a substrate, the first graded layer comprising first, second and third optical materials, the first material being silicon, the second material being an index of refraction adjusting material and the third material being a lattice constant adjusting material, wherein concentrations of the second and third materials increase with the height of the first graded layer; and a second graded layer above the first graded layer, the second graded layer comprising the first, second and third optical materials, wherein concentrations of the second and third materials decrease with the height of the second graded layer.

60. The waveguide structure of claim 59 wherein the second optical material is germanium.

61. The waveguide structure of claim 60 wherein the third optical material is carbon.

62. The waveguide structure of claim 59 wherein the concentrations of the second and third materials increase monotonically in the first graded layer and decrease monotonically in the second graded layer.

63. The waveguide structure of claim 59 wherein the concentrations of the second and third materials increase linearly in the first graded layer and decrease linearly in the second graded layer.

64. The waveguide structure of claim 59 further comprising:

a uniform layer between the first graded layer and the second graded layer, the uniform layer comprising the first, second and third optical materials at substantially constant concentration throughout the uniform layer.

65. The waveguide structure of claim 64 wherein the second optical material is germanium.

66. The waveguide structure of claim 64 wherein the third optical material is carbon.

67. A waveguide structure comprising:

a substrate having an etched pattern; and a uniform layer filling the etched pattern, the uniform layer comprising silicon, germanium, and a lattice constant adjusting material, wherein the concentrations of germanium and the lattice constant adjusting material remain substantially constant throughout the uniform layer.

68. The waveguide structure of claim 67 wherein the lattice constant adjusting material is carbon.

69. The waveguide structure of claim 67 further comprising:

a blocking layer between the uniform layer and the substrate.

70. The waveguide structure of claim 69 wherein the blocking layer is epitaxial silicon.

71. The waveguide structure of claim 67 further comprising:

a clading layer covering the uniform layer.

72. The waveguide structure of claim 71 wherein the clading layer is epitaxial silicon.

73. A waveguide structure, comprising:

a silicon substrate having an etched trench;

a first graded SiGeC layer covering sidewall and bottom surfaces in the trench;

a uniform SiGeC layer formed in the trench over the first graded SiGeC layer; and a second graded SiGeC layer covering the first graded layer and the uniform layer.

74. The waveguide structure of claim 73 wherein germanium and carbon concentrations in the first graded layer increase with height.

75. The waveguide structure of claim 73 wherein germanium and carbon concentrations in the second graded layer decrease with height.

* * * * *

UNITED STATES PATENT AND TRADEMARK OFFICE
CERTIFICATE OF CORRECTION

PATENT NO. : 6,905,542 B2
DATED : June 14, 2005
INVENTOR(S) : Samoilov et al.

It is certified that error appears in the above-identified patent and that said Letters Patent is hereby corrected as shown below:

Title page,
Item [56], References Cited, OTHER PUBLICATIONS,
"Liu et al." reference, delete "smoth" and insert -- smooth --; and delete "voL" and insert -- vol --.
"Pogossian et al." reference, delete "Poggossian, S.P." and insert -- Pogossian, S.P. --.

Drawings,
Sheet 3, Figure 2B, delete "Photoelctron" and insert -- Photoelectron --.

Column 10,
Line 25, delete "hydroflouric" and insert -- hydrofluoric --.
Lines 32-33, delete "hydroflouric" and insert -- hydrofluoric --.
Line 52, delete "130 131," and insert -- 130, 131 --.

Column 19,
Line 28, after "chamber" delete ":" and insert -- ; --.

Column 20,
Line 26, after "layer" delete "layer".

Column 22,
Lines 30 and 32, delete "clading" and insert -- cladding --.

Signed and Sealed this

Twenty-seventh Day of December, 2005

JON W. DUDAS
*Director of the United States Patent and Trademark Office*